United States Patent
Yu et al.

(10) Patent No.: US 11,380,086 B2
(45) Date of Patent: Jul. 5, 2022

(54) POINT CLOUD BASED 3D SEMANTIC SEGMENTATION

(71) Applicant: Intel Corporation, Santa Clara, CA (US)

(72) Inventors: Kun Yu, Shanghai (CN); Yan Hao, Shanghai (CN); Lu Li, Shanghai (CN); Zhiyong Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 16/828,987

(22) Filed: Mar. 25, 2020

(65) Prior Publication Data
US 2021/0303912 A1 Sep. 30, 2021

(51) Int. Cl.
*G06V 10/75* (2022.01)
*G06K 9/62* (2022.01)
*G06N 3/04* (2006.01)
*G06N 3/08* (2006.01)
*G06V 10/22* (2022.01)

(52) U.S. Cl.
CPC ......... *G06V 10/757* (2022.01); *G06K 9/6215* (2013.01); *G06K 9/6232* (2013.01); *G06N 3/0454* (2013.01); *G06N 3/084* (2013.01); *G06V 10/23* (2022.01)

(58) Field of Classification Search
CPC .. G06K 9/6211; G06K 9/2072; G06K 9/6215; G06K 9/6232; G06N 3/0454; G06N 3/084

USPC ......................................................... 382/154
See application file for complete search history.

(56) References Cited

U.S. PATENT DOCUMENTS

| | | | |
|---|---|---|---|
| 2019/0130525 A1* | 5/2019 | Mou | G06T 9/00 |
| 2019/0297326 A1* | 9/2019 | Reda | G06T 5/20 |
| 2020/0034627 A1* | 1/2020 | Zhu | G06K 9/6277 |
| 2020/0084427 A1* | 3/2020 | Sun | G06N 3/084 |
| 2021/0125338 A1* | 4/2021 | Zhang | G06K 9/6269 |

OTHER PUBLICATIONS

The extended European search report for European Application No. 20213396.3, dated May 14, 2021, 12 pages.
MeteorNet: Deep Learning on Dynamic 3D Point Cloud Sequences, written by Xingyu Liu et.al., dated Oct. 27, 2019, 10 pages.
(Continued)

*Primary Examiner* — Michael R Neff
(74) *Attorney, Agent, or Firm* — Law Offices of Liaoteng Wang

(57) ABSTRACT

System and techniques are provided for three-dimension (3D) semantic segmentation. A device for 3D semantic segmentation includes: an interface, to obtain a point cloud data set for a time-ordered sequence of 3D frames, the 3D frames including a current 3D frame and one or more historical 3D frames previous to the current 3D frame; and processing circuitry, to: invoke a first artificial neural network (ANN) to estimate a 3D scene flow field for each of the one or more historical 3D frames by taking the current 3D frame as a reference frame; and invoke a second ANN to: produce an aggregated feature map, based on the reference frame and the estimated 3D scene flow field for each of the one or more historical 3D frames; and perform the 3D semantic segmentation based on the aggregated feature map.

24 Claims, 14 Drawing Sheets

(56) References Cited

OTHER PUBLICATIONS

FlowNet3D: Learning Scene Flow in 3D Point Clouds, written by Xingyu Liu et.al., dated Jun. 15, 2019, 9 pages.
Flow-Guided Feature Aggregation for Video Object Detection, written by Xizhou Zhu et.al., dated Mar. 29, 2017, 10 pages.
PointNet: Deep Learning on Point Sets for 3D Classification and Segmentation, written by Charles R. Qi et.al., dated Dec. 2, 2016, 19 pages.

* cited by examiner

Input: LiDAR 3D point cloud frames $\{I_i\}$, aggregation range K
for k = 1 to K + 1 do  //initialize feature buffer
    $f_k = N_{feat}(I_k)$
end for
for i = 1 to ∞ do  //reference frame
    for j = max(1, i - K) to i do  //historical frames
        $f_{j \to i} = W(f_j, 3DF(I_j, I_i))$  //3D scene flow-guided warp
        $3Df^e_{j \to i}, 3Df^e_i = \Gamma(f_{j \to i}, f_i)$  //compute embedding features
        $w_{j \to i} = \exp\left(\frac{3Df^e_{j \to i} \cdot 3Df^e_i}{|3Df^e_{j \to i}||3Df^e_i|}\right)$  //compute aggregation weight
    end for
    $\overline{f_i} = \sum_{j=i-K}^{i} w_{j \to i} f_{j \to i}$  //aggregate features
    $y_i = N_{seg}(\overline{f_i})$  //segmentation on the aggregated reference frame
    $f_{i+1} = N_{feat}(I_{i+1})$  //update feature buffer
end for
output: segmentation results $\{y_i\}$

FIG. 7

POINT CLOUD BASED 3D SEMANTIC SEGMENTATION

TECHNICAL FIELD

Embodiments described herein generally relate to computer vision techniques, and more specifically to a point cloud based three-dimension (3D) semantic segmentation.

BACKGROUND

Autonomous or semi-autonomous automotive technologies, often referred to as "self-driving" or "assisted-driving" operation in automobiles, are undergoing rapid development and deployment in commercial- and consumer-grade vehicles. These systems use an array of sensors to continuously observe the vehicle's motion and surroundings. One of common sensor technologies is Light Detection and Ranging (LiDAR). LiDAR is a system that combines laser, global positioning system (GPS) and inertial navigation system (INS) technologies to obtain point clouds and generate an accurate ground Digital Elevation Model (DEM).

In the autonomous or semi-autonomous automotive technologies, semantic segmentation may be used to provide information about other vehicles, pedestrians and other objects on a road, as well as information about lane markers, curbs, and other relevant items. Accurate semantic segmentation plays a significant role in safety of autonomous driving.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 shows an example workflow of the neural network of FIG. 6.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

A variety of semantic segmentation techniques may be based on data provided by a variety of sensors. When using LiDAR to observe surroundings of a vehicle, the data are provided as point cloud data, which may also be referred as a LiDAR point cloud. Semantic segmentation based on point cloud data is almost the most important functionality in a perception module of autonomous driving. A regular approach of semantic segmentation is to reduce dimensionality of the point cloud data into 2D and then perform 2D semantic segmentation. Another approach of semantic segmentation is based on point cloud data of a current frame. However, these approaches only focus on single frame segmentation, and don't take point cloud data of historical frames into consideration, such that these approaches are susceptible to LiDAR data noise. These approaches are especially inefficient when dealing with a situation of part occlusion obstacles, which is common in point cloud data.

Figure 1:
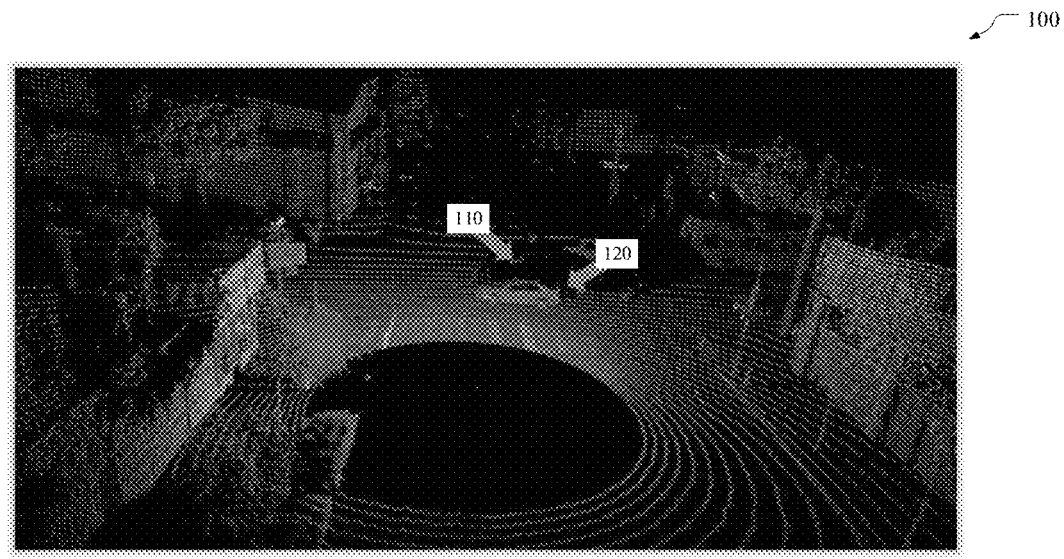
FIG. 1 shows an example situation of part occlusion obstacles in point cloud data, according to an embodiment of the disclosure

FIG. 1 shows an example situation 100 of part occlusion obstacles in point cloud data according to an embodiment of the disclosure. As can be seen in FIG. 1, a vehicle indicated by an arrow 110 is obscured by another vehicle indicated by an arrow 120. The situation of FIG. 1 is an example and not meant to limit the present disclosure. There may be other situations, for example, a pedestrian may be obscured by a vehicle, a tree or other objects.

Embodiments of the present application provides architectures to perform 3D semantic segmentation based on a point cloud data set for a time-ordered sequence of 3D frames, including a current 3D frame and one or more historical 3D frames previous to the current 3D frame. The point cloud data set for a time-ordered sequence of 3D frames may be captured by a LiDAR mounted on a vehicle.

As used herein, the phase "current 3D frame" means a 3D frame that is of interest currently or for which the 3D semantic segmentation is to be performed; and the phase "historical 3D frame" means a 3D frame occurred before the current 3D frame.

As used herein, the term "3D scene flow" means a 3D motion field of points in the scene. A "3D scene flow" used herein may be interchangeable with a "3D optical flow", "3D flow", "range flow", "scene flow", etc.

Figure 2:
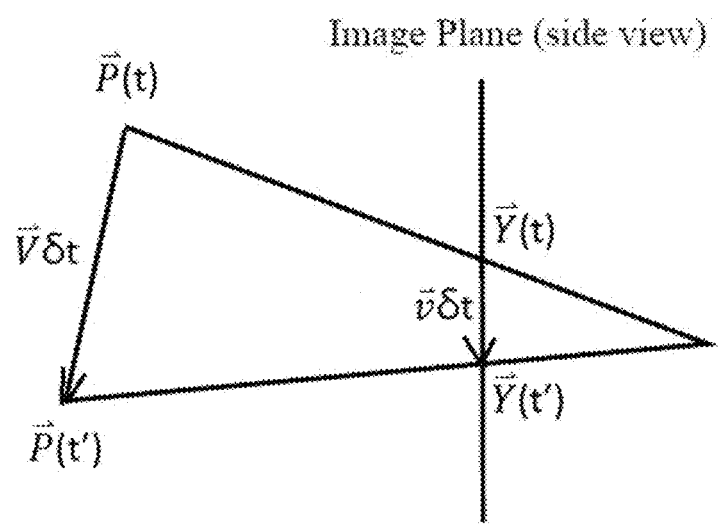
FIG. 2 shows an example situation illustrating a relationship between a two-dimension (2D) optical flow and corresponding 3D scene flow, according to an embodiment of the disclosure.

As used herein, the term "2D optical flow" means a perspective projection of corresponding 3D scene flow. FIG. 2 shows an example situation illustrating a relationship between a 2D optical flow and corresponding 3D scene flow, according to an embodiment of the disclosure. As shown in FIG. 2, $\vec{V}$ is a 3D velocity of a 3D point $\vec{P}(t)=(X, Y, Z)$, and $\vec{v}=(u, v)$ is a 2D image of $\vec{V}$, i.e., $\vec{v}$ is a perspective projection of $\vec{V}$. When $\vec{P}(t)$ moves with a displacement $\vec{V}\delta t$ to $\vec{P}(t')$ from time t to time t', its image $\vec{Y}(t)=(x, y, f)$ moves to $\vec{Y}(t')=(x', y', f)$ with a displacement of $\vec{v}\delta t$, where $\delta t=t'-t$ and f is a focal length of a sensor for imaging. In the situation, $\vec{v}$ is known as an image velocity or a 2D optical flow As used herein, the term "FlowNet3D" refers to an end-to-end (EPE) deep learning architecture for 3D scene flow estimation.

As used herein, the term "EPE loss function" refers generally to an end-to-end point error. In particular, the end-to-end point error measures an average Euclidean distance (i.e., L2 distance) between an estimated flow vector (which includes 2D and 3D versions) to a ground truth flow vector. The EPE loss function is used to train an artificial neural network (ANN), such as, the well-known FlowNet/FlowNet2.0 and FlowNet3D etc.

Next, for simplicity, a 2D RGB image is used to explain feature warping. For example, a frame indicated as $f_0$ includes a pixel $p_0(x_0, y_0)$. The pixel $p_0(x_0, y_0)$ has a new position $p_1(x_1, y_1)$ in a frame immediately subsequent to the frame $f_0$, which is indicated as $f_1$. A flow estimation network (for example, the FlowNet or FlowNet2.0) may be used to estimate a velocity (u, v) of $p_0$ in the frame $f_0$. The new position $p_1$ in the frame $f_1$ may then be estimated by $(x_0, y_0)+(u, v)\delta t=(x_1, y_1)$, where $\delta t$ is a time difference between the two frames. The above operation may be performed on all pixels in in the frame $f_0$ so as to obtain a predicted frame, which is indicated as frame $f_1'$. The process from frame $f_0$ to $f_1'$ is known as raw image warping. For a feature map produced by a deep learning optimization algorithm, the progress is similar. It is assumed that a flow field $M_{i \to j}=F(I_i, I_j)$ is produced by a flow network F (e.g., the FlowNet) based on a reference frame $I_i$ and a frame $I_j$ previous to the reference frame. Feature maps associated with the frame $I_j$ may be warped to the reference frame $I_i$ by a warping function, according to the flow field $M_{i \to j}$. The warping function is defined as $f_{j \to i}=W(f_j, M_{i \to j})=W(f_j, F(I_i, I_j))$, where W(.) is a bilinear warping function applied on all locations for each channel in the feature maps, $f_{j \to i}$ denotes a feature map warped from the frame $I_j$ to the frame $I_i$, and $f_j$ denotes a feature map of frame $I_j$ without any feature warping operation.

As used herein, the term "feature aggregation" refers to combining feature maps of a reference frame and warped feature maps of one or more frames neighboring the reference frame (including historical frames or future frames) into a smaller set of feature maps. Generally speaking, the one or more frames neighboring the reference frame may be aggregated with the reference frame to obtain an aggregated frame.

As used herein, the term "semantic segmentation" may include "2D semantic segmentation" and "3D semantic segmentation". 2D semantic segmentation refers to a process of linking each pixel in an image to a class label, which may include a person, a vehicle, a bike, a tree, a curb, a road surface etc., for example. 3D semantic segmentation is similar as 2D semantic segmentation, except that the operation object is a red-green-blue-depth (RGBD) image or a point cloud set, instead of a 2D image.

As used herein, the term "artificial neural network (ANN)" is a collective name of neural networks, which is interchangeable with a neural network, deep neural network (DNN), deep learning network and others.

As used herein, the term "full convolution network (FCN)" refers to a famous end-to-end 2D semantic segmentation deep learning architecture, and the term "U-net" refers to another famous end-to-end 2D semantic segmentation deep learning architecture.

As used herein, the term "PointNet" refers to an end-to-end 3D semantic segmentation deep learning architecture.

As used herein, the term "Softmax" refers to a loss function that takes a vector of K real numbers as an input, and normalizes the vector into a probability distribution, which consists of K probabilities proportional to exponentials of the K real numbers. The Softmax loss function is used to train a 2D or 3D semantic segmentation network herein.

Figure 3:
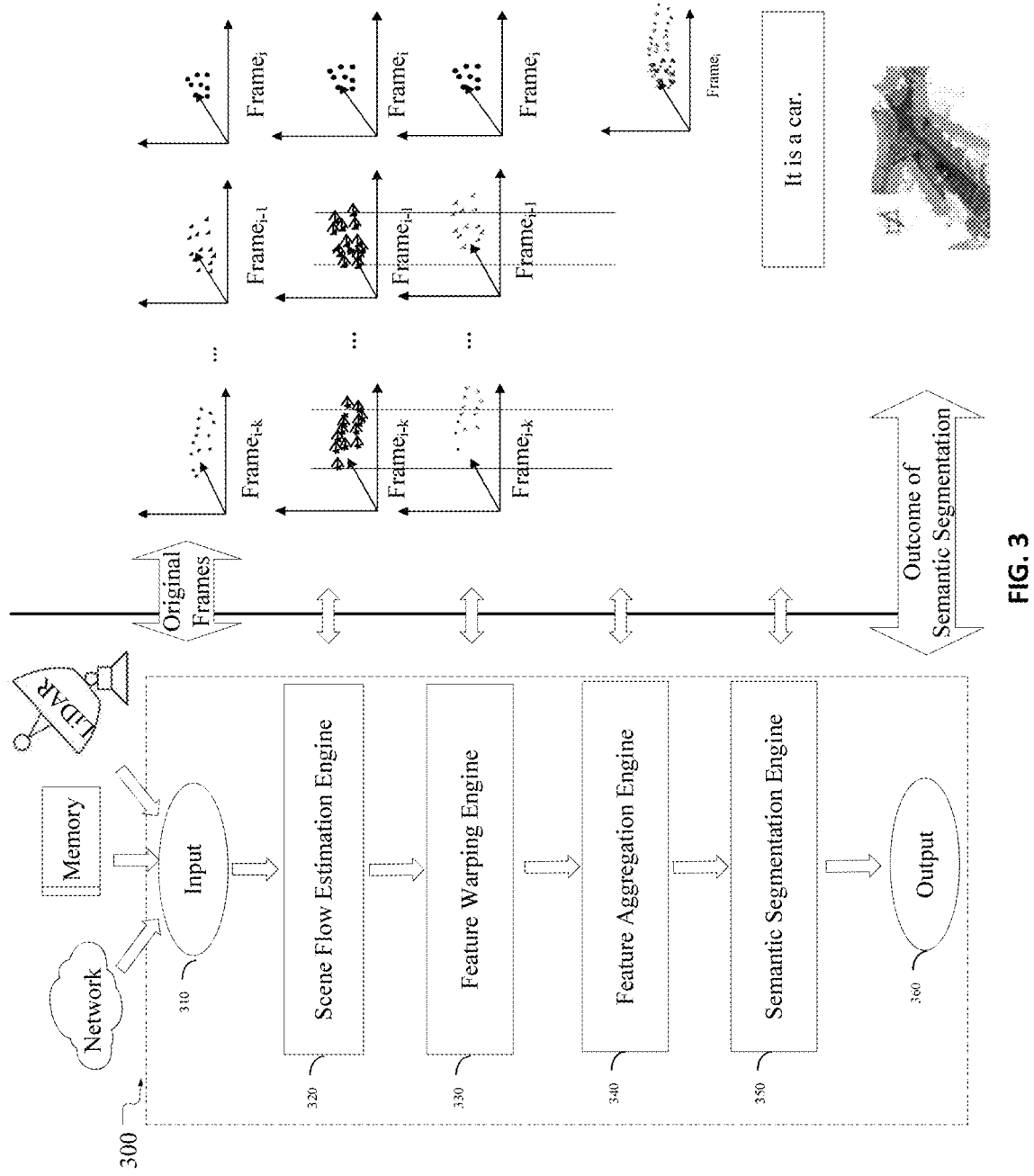
FIG. 3 shows an example system for point cloud based 3D semantic segmentation, along with an illustrative process flow, according to an embodiment of the disclosure.

FIG. 3 shows an example system 300 for point cloud based 3D semantic segmentation, along with an illustrative process flow, according to an embodiment of the disclosure. As illustrated, the system is composed of a number of subsystems, components, circuits, modules, or engines, which for the sake of brevity and consistency are termed engines, although it will be understood that these terms may be used interchangeably. Engines are realized in hardware, or in hardware controlled by software or firmware. As such, engines are tangible entities specially-purposed for performing specified operations and are structured in a certain manner.

In an example, circuitry may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a tangible machine-readable storage medium. In an example, the software, when executed by the underlying hardware of the engine, causes the hardware to perform the specified operations. Accordingly, an engine is physically constructed, or specifically configured (e.g., hard-wired), or temporarily configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

Figure 4:
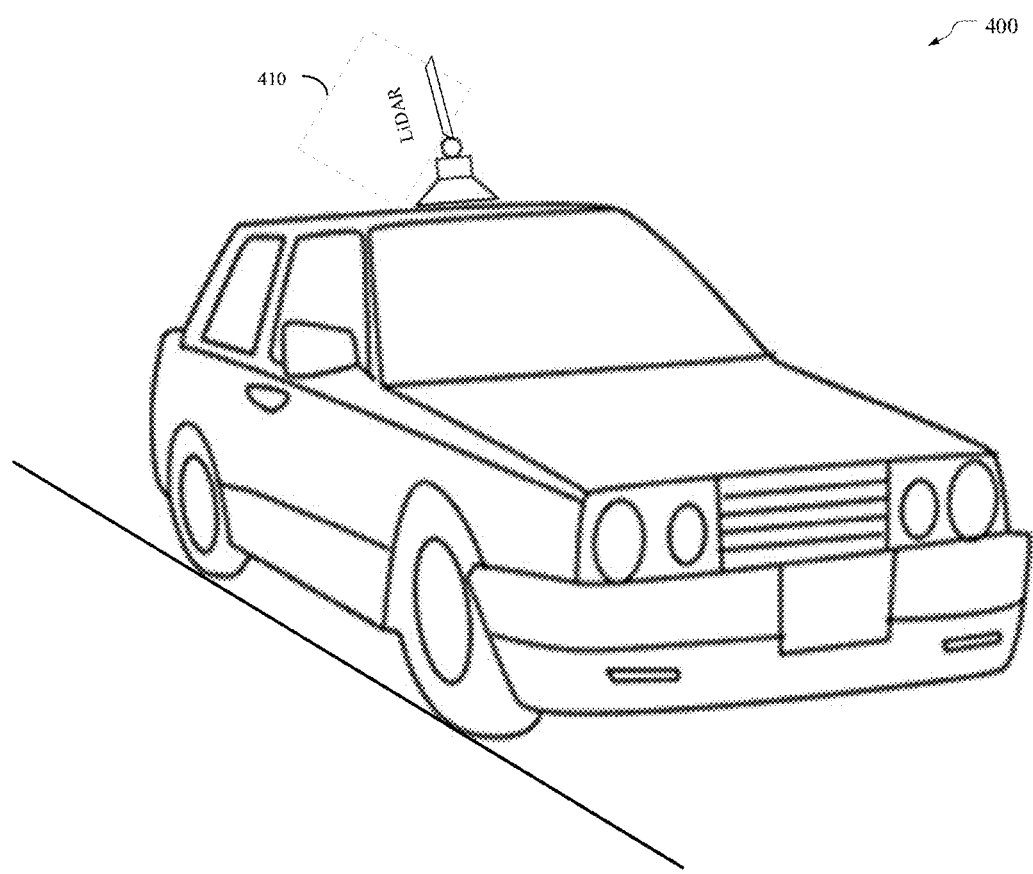
FIG. 4 shows a vehicle with a LiDAR mounted thereon, according to an embodiment of the disclosure.

In an embodiment, the system 300 may be mounted on a vehicle having a LiDAR, as shown in FIG. 4. The system 300 may be used to provide 3D semantic segmentation results of surroundings along a route of the vehicle, for use with an autonomous vehicle control system. In another embodiment, the system 300 may be implemented on a remote server communicatively connected with the vehicle.

As depicted, the system 300 may include an input interface 310 to receive a point cloud data set from a LiDAR, a network, or a local memory. In an embodiment, the point cloud data set includes point cloud data for time-ordered sequence of 3D frames. As shown on the right side of the dividing line, the time-ordered sequence of 3D frames may include $frame_i$, $frame_{i-1}$, . . . , $frame_{i-k}$, where i and k are positive integers and k<i. As used herein, $frame_i$ is the current 3D frame, and $frame_{i-1}$, . . . , $frame_{i-k}$ are historical 3D frames. It is supposed to perform 3D semantic segmentation for the points illustrated in $frame_i$, which are point cloud data for the rear of a car, for example. As can be seen, because of part occlusion as shown in FIG. 1, these points are not enough for a traditional semantic segmentation architecture, which performs semantic segmentation based only on the current frame, to perform semantic segmentation correctly.

The system 300 may include a scene flow estimation engine 320 to perform 3D scene flow estimation for $frame_{i-1}$, . . . , $frame_{i-k}$, taking $frame_i$ as a reference frame. A velocity of each point on $frame_{i-1}$, . . . , $frame_{i-k}$ may be predicted based on the 3D scene flow estimation. As shown on the right side of the dividing line, the "arrows (→)" on $frame_{i-1}$, . . . , $frame_{i-k}$ simulate a velocity of each point.

The system 300 may include a feature warping engine 330 to obtain a warped feature map corresponding to each of $frame_{i-1}$, . . . , $frame_{i-k}$, based on the 3D scene flow estimation for the frame. For example, a displacement of each point on $frame_{i-1}$, . . . , $frame_{i-k}$ may be predicted according the predicted velocity and a corresponding time difference between the frame including the point and the reference frame. A warped 3D frame corresponding to each of $frame_{i-1}$, . . . , $frame_{i-k}$ may be obtained based on the predicted displacement of each point on each of $frame_{i-1}$, . . . , $frame_{i-k}$ and an initial position (e.g., coordinates) of the point in the historical 3D frames. The warped feature map corresponding to each of $frame_{i-1}$, . . . , $frame_{i-k}$ may be obtained based on the warped 3D frame corresponding to each of $frame_{i-1}$, . . . , $frame_{i-k}$. As another example, the warped feature map corresponding to each of $frame_{i-1}$, . . . , $frame_{i-k}$ may be obtained by warping an original feature map of each of $frame_{i-1}$, . . . , $frame_{i-k}$ based on the estimated 3D scene flow field for each of $frame_{i-1}$, . . . , $frame_{i-k}$.

The system 300 may include a feature aggregation engine 340 to aggregate the warped feature maps corresponding to $frame_{i-1}$, . . . , $frame_{i-k}$ with the an original feature map of the reference frame (i.e., frame) to produce the aggregated feature map.

The system 300 may further include a semantic segmentation engine 350 to perform the 3D semantic segmentation for the points illustrated in $frame_i$, based on the aggregated feature map. As shown by the illustrative process flow, the semantic segmentation engine 350 identifies correctly that the points on $frame_i$ belongs to a car, according to history information provided by $frame_{i-1}$, . . . , $frame_{i-k}$.

The above process will be performed similarly for all points in the current frame. The semantic segmentation engine 350 may then obtain and output an outcome of 3D semantic segmentation. As shown, the outcome of 3D semantic segmentation may be rendered as a 3D map with different labels to identify different objects.

The system 300 may also include an output interface 360 to output the outcome of the 3D semantic segmentation. In an embodiment, the output interface 360 may be connected to a screen to display the outcome of the 3D semantic segmentation. In another embodiment, the output interface 360 may be connected to a transceiver for transmitting the outcome of the 3D semantic segmentation to a device communicatively connected with the system 300. The outcome of the 3D semantic segmentation may be used by an autonomous vehicle control system to make a decision on a driving strategy.

In an embodiment, the scene flow estimation engine 320, feature warping engine 330, feature aggregation engine 340 and semantic segmentation engine 350 may be implemented by ANNs and processing circuitry supporting the ANNs. For example, the scene flow estimation engine 320 may be implemented by the FlowNet3D as mentioned above, and the feature warping engine 330, feature aggregation engine 340 and semantic segmentation engine 350 may be may be implemented by the PointNet as mentioned above.

FIG. 4 shows a vehicle 400 with a LiDAR 410 mounted thereon, according to an embodiment of the disclosure. The vehicle 400 may be an autonomous vehicle, for example. The LiDAR 410 may be used to capture point cloud data for surroundings of the vehicle continuously, when the vehicle is driving along a road. The LiDAR 410 may then provide the captured point cloud data to the system 300 of FIG. 3 for 3D semantic segmentation of the surroundings. In an example, more than one LiDAR 410 may be mounted on the vehicle 400. For example, the vehicle 400 may have multiple LiDARs 410 pointing in different directions. The vehicle 400 may also have multiple LiDARs 410 pointing in the same or similar directions with respect to the vehicle, but mounted at different locations. Although single-LiDAR vehicles are discussed herein, multiple-LiDAR vehicles may also be used, where some or all of the point cloud data may be captured by different LiDARs, or may be created from a composite of point cloud data captured from multiple LiDARs. Real-time operation, in the present context, operates with imperceptible or nominal processing delay such that 3D semantic segmentation of the surroundings is obtained at a rate that is consistent with the rate at which 3D point cloud data for the surroundings are captured.

Figure 5:
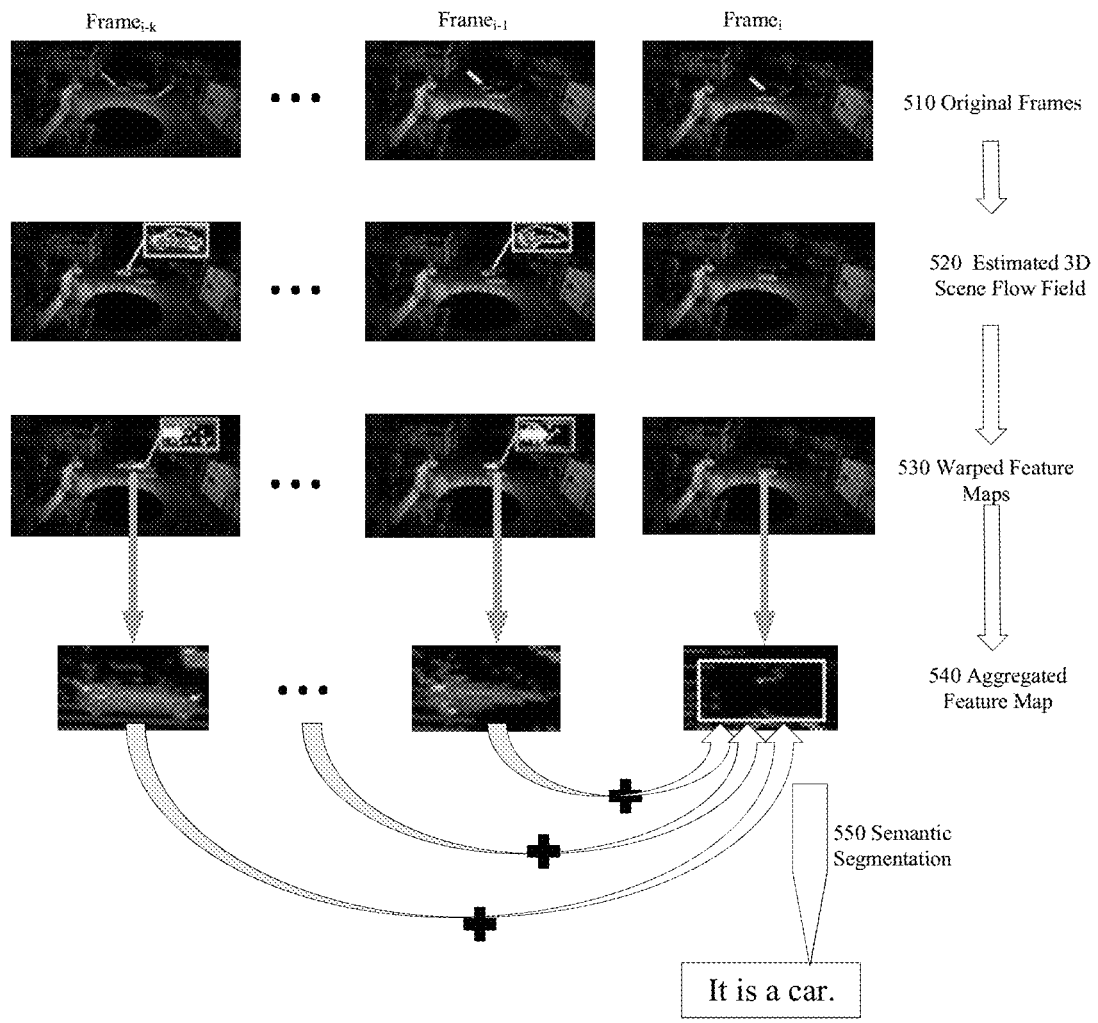
FIG. 5 shows an illustrative process flow of using the example system of FIG. 3 to perform 3D semantic segmentation based on the point cloud data of the example situation of FIG. 1.

FIG. 5 shows an illustrative process flow of using the example system 300 of FIG. 3 to perform 3D semantic segmentation based on the point cloud data of the example situation 100 of FIG. 1. As mentioned above, the vehicle indicated by the arrow 110 is obscured by the vehicle indicated by the arrow 120 in FIG. 1.

At 510, a point cloud data set for a time-ordered sequence of original 3D frames, including $frame_i$, $frame_{i-1}$, . . . , frame$_{i-k}$ (where i and k are positive integers and k<i) are inputted into the system 300. At 520, the point cloud data set is processed by the scene flow estimation engine 320 to estimate a 3D scene flow field for each of frame$_{i-1}$, ..., frame$_{i-k}$, with reference to frame$_i$. At 530, a warped feature map corresponding to each of frame$_{i-1}$, ..., frame$_{i-k}$ is obtained by the feature warping engine 330 based on the estimated 3D scene flow field for the corresponding frame. At 540, the warped feature maps corresponding to frame$_{i-1}$, ..., frame$_{i-k}$ are aggregated with an original feature map of frame$_i$, by the feature aggregation engine 340, to produce an aggregated feature map. For example, the original feature map of frame$_i$ may be extracted from frame$_i$ by a 3D feature extract engine, which may be a sub-network of the ANN. At 550, 3D semantic segmentation is performed based on the aggregated feature map by the semantic segmentation engine 350.

For the 3D scene flow field estimation at 520, a 3D scene flow field for frame$_j$ (j=i-1, ..., i-k) may be defined as M$_{i \to j}$=3DF (frame$_i$, frame$_j$).

At 530, the original feature maps of the historical 3D frames are warped to the reference frame, according to the 3D scene flow field for each of the historical 3D frames. The original feature maps may be outputs of N$_{feat}$, which represent a 3D feature extract sub-network for extracting an original feature map for each frame. A warping function may be defined as:

$$f_{j \to i} = W(f_j, M_{i \to j}) = W(f_j, 3DF(\text{frame}_i, \text{frame}_j)), \quad j = i-1, \ldots, i-k, \quad (1)$$

where W(.) is a trilinear warping function applied on all locations for each channel in the feature maps, and f$_{j \to i}$ denotes the feature maps warped from historical 3D frame (frame$_j$) to the reference frame (frame$_i$) and f$_j$ denotes a feature map of frame$_j$ without any feature warping operation.

For the feature warping at 530, in an embodiment, a warped 3D feature map corresponding to each of frame$_{i-1}$, ..., frame$_{i-k}$ may be obtained by predicting a displacement of each point on each of frame$_{i-1}$, ..., frame$_{i-k}$ based on the estimated 3D scene flow field of the corresponding frame and a corresponding time difference between the frame and frame$_i$; obtaining the warped 3D frame corresponding to each of frame$_{i-1}$, ..., frame$_{i-k}$ based on the predicted displacement of each point on each of frame$_{i-1}$, ..., frame$_{i-k}$ and initial coordinates of the point in the historical 3D frames; and obtaining a feature map of the warped 3D frame corresponding to each of frame$_{i-1}$, ..., frame$_{i-k}$. In the embodiment, the feature map of the warped 3D frame corresponding to each of frame$_{i-1}$, ..., frame$_{i-k}$ may be aggregated with the original feature map of frame$_i$ at 540, to produce an aggregated feature map.

For the feature warping at 530, in another embodiment, the warped feature map corresponding to each of frame$_{i-1}$, ..., frame$_{i-k}$ may be obtained by warping an original feature map of each of frame$_{i-1}$, ..., frame$_{i-k}$ based on the estimated 3D scene flow field for each of frame$_{i-1}$, ..., frame$_{i-k}$. In the embodiment, at 540, the warped feature map for each of frame$_{i-1}$, ..., frame$_{i-k}$ may be aggregated with the original feature map of frame$_i$ to produce an aggregated feature map. This approach tends to achieve a better result, since a selection of the feature maps will be involved in an end-to-end training process of the ANN.

That is to say, during the feature aggregation at 540, the original feature map of the reference frame, i.e., frame$_i$, accumulates multiple feature maps from the historical 3D frames, i.e., frame$_{i-1}$, ..., frame$_{i-k}$. These feature maps provide rich and diverse information for the 3D semantic segmentation, especially for part occlusion obstacles situation as illustrated by FIG. 1.

In an embodiment, during the feature aggregation process, different weights may be applied for different historical 3D frames, i.e., frame$_{i-1}$, ..., frame$_{i-k}$. For example, different spatial locations may be assigned different weights and all feature channels at the same spatial location may share the same weight. As a result, a weight for each of frame$_{i-1}$, ..., frame$_{i-k}$ may be based on a spatial location of the frame. Particularly, a weight for each of frame$_{i-1}$, ..., frame$_{i-k}$ may be based on a degree of proximity in time of the frame to frame$_i$. In the context, feature warping from each of frame$_{i-1}$, ..., frame$_{i-k}$ to frame$_i$ may be denoted as f$_{j \to i}$, j=i-1, ..., i-k, and a corresponding weight to be applied for the warped feature maps may be denoted as w$_{j \to i}$. The aggregated feature map ($\bar{f}_i$) at the reference frame (frame$_i$) may then be expressed as:

$$\bar{f}_i = \Sigma_{j=i-k}^{i} w_{j \to i} f_{j \to i} \quad (2)$$

As can be seen, k defines a range of historical frames for aggregation.

As another example, an adaptive weight may be applied for each of frame$_{i-1}$, ..., frame$_{i-k}$. The adaptive weight indicates importance of the corresponding historical 3D frame to the reference frame (frame). On one hand, if the warped feature map f$_{j \to i}$(p) at location p is close to the original feature map of frame$_i$, i.e., f$_i$(p), in time, it will be assigned a larger weight; or otherwise, it will be assigned a smaller weight. A cosine similarity metric is used herein to measure the similarity between the warped feature map and the original feature map of the reference frame. A tiny network $\Gamma$(.) is applied to feature maps f$_i$ and f$_{j \to i}$, to project the feature maps to a new embedding for similarity measurement, similarly as described by Xizhou Zhu etc. in their article "Flow-Guided Feature Aggregation for Video Object Detection" (arXiv preprint arXiv:1703.10025, 2017), which is incorporated herein by reference in its entirety. As a result, an input to a layer for calculating the weight is $\Gamma$(N$_{feat}$) instead of N$_{feat}$ itself. A corresponding weight to be applied for the warped feature map f$_{j \to i}$(p) may be denoted as w$_{j \to i}$(p), which may be estimated by the following equation:

$$w_{j \to i}(p) = \exp\left(\frac{3Df_{j \to i}^e(p) \cdot 3Df_i^e(p)}{|3Df_{j \to i}^e(p)||3Df_i^e(p)|}\right), \quad (3)$$

where 3Df$^e$=$\Gamma$(N$_{feat}$) denotes 3D embedding feature maps for similarity measurement. The weight w$_{j \to i}$ may be obtained by normalizing w$_{j \to i}$(p) for every spatial location p over the historical 3D frames. On another hand, the importance of the corresponding historical 3D frame to the reference frame may be determined by a combination of a degree of proximity (e.g., in time) of the historical 3D frame to the reference frame and a degree of occlusion of an object of interest in the historical 3D frame.

At 550, the aggregated feature map $\bar{f}_i$ may be fed into the semantic segmentation engine 350 to obtain an outcome:

$$y_i = N_{seg}(\bar{f}_i), \quad (4)$$

where N$_{seg}$ denotes a 3D semantic segmentation sub-network.

Figure 6:
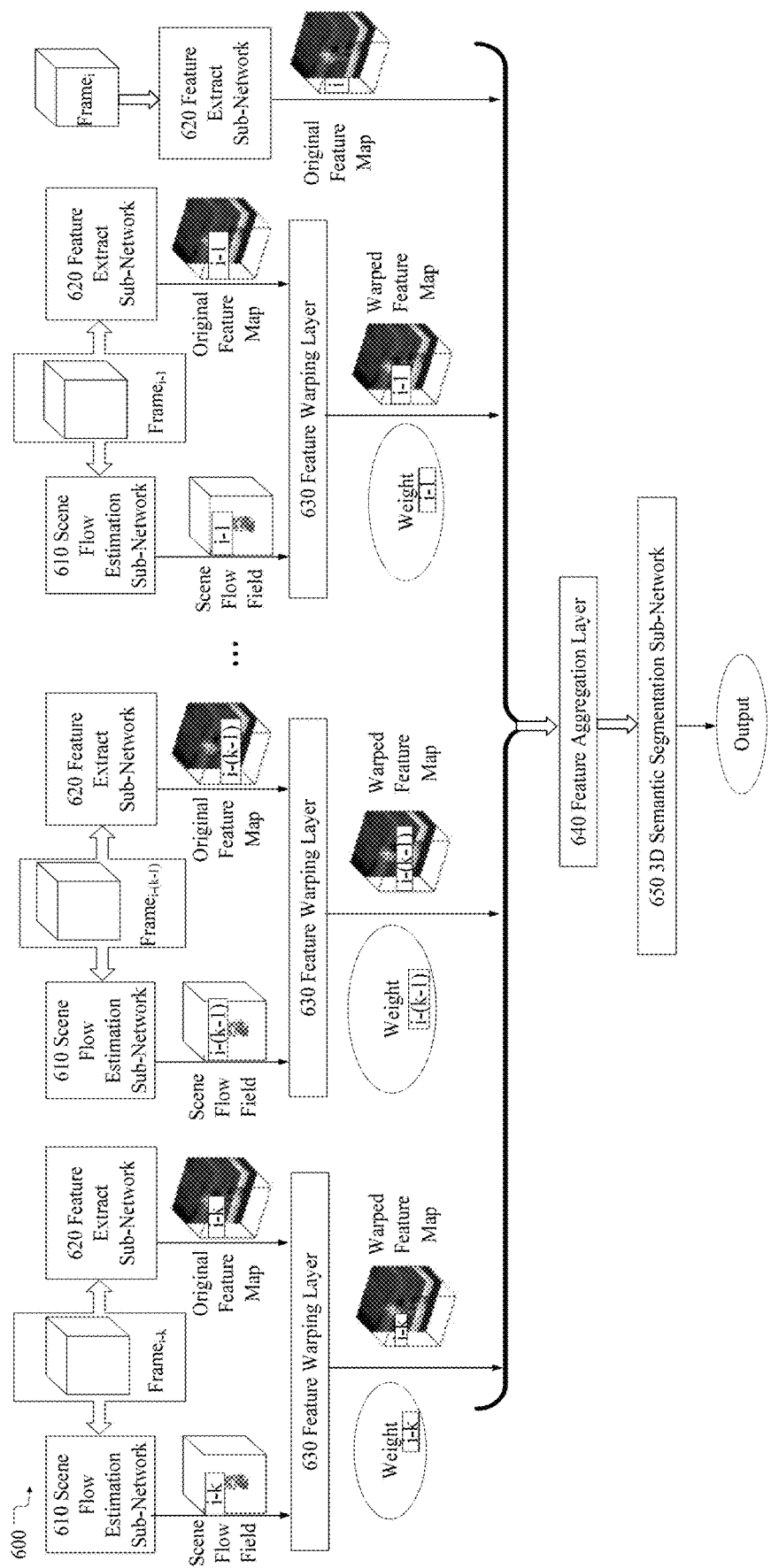
FIG. 6 shows a schematic diagram of a neural network for point cloud based 3D semantic segmentation, according to an embodiment of the disclosure.

FIG. 6 shows a schematic diagram of a neural network 600 for point cloud based 3D semantic segmentation, according to an embodiment of the disclosure. The neural network 600 has been trained to produce a 3D semantic segmentation outcome directly from the point cloud data for a time-ordered sequence of 3D frames. Therefore, the neural network 600 is able to respond quickly and without an appreciable delay. The 3D semantic segmentation outcome can be used to assist an autonomous vehicle control system to determine a strategy for driving.

A point cloud data set for a time-ordered sequence of 3D frames is provided to the neural network 600 as an input. The 3D frames may include a current 3D frame (indicated as $frame_i$) and one or more historical 3D frames (indicated as $frame_{i-k}$, $frame_{i-(k-1)}$, ..., $frame_{i-1}$, where i and k are positive integers and k<i) previous to the current 3D frame. The neural network 600 produces an outcome of 3D semantic segmentation as output. The outcome of 3D semantic segmentation may be rendered as a 3D map with different labels to identify different objects or any other format to signal the autonomous vehicle control system, for example.

The neural network 600 may include architectures to process each of $frame_{i-k}$, $frame_{i-(k-1)}$, ..., $frame_{i-1}$ and $frame_i$. The number of the historical 3D frames that can be processed by the neural network 600 may be limited by a performance of hardware supporting the neural network. The architectures for the historical 3D frames, i.e., $frame_{i-k}$, $frame_{i-(k-1)}$, ..., $frame_{i-1}$ are similar, which is referred to as Arch-H herein. The architecture for the current 3D frame ($frame_i$) is referred to as Arch-R herein, since $frame_i$ is to be taken as a reference frame during the whole process.

Taking the Arch-H for $frame_{i-k}$ as an example, as illustrated, the Arch-H may include a scene flow estimation sub-network 610 to estimate a 3D scene flow field for $frame_{i-k}$. The 3D scene flow field provides a basis for feature warping later. For example, the scene flow estimation sub-network 610 may be the FlowNet3D or any other network capable of implementing the similar operation.

The Arch-H may include a feature extract sub-network 620 to produce an original feature map for $frame_{i-k}$. The original feature map is an operation object of feature warping. For example, the feature extract sub-network 620 may be a part of the PointNet, which may be referred to as "PointNetFeat".

The Arch-H may include a feature warping layer 630 to warp the original feature map produced by the feature extract sub-network 620, based on the 3D scene flow field estimated by the scene flow estimation sub-network 610, and with reference to $frame_i$. The feature warping layer 630 may produce a warped feature map for $frame_{i-k}$ and obtain an adaptive weight accompanying the warped feature map. Both the warped feature map and the adaptive weight will participate in feature aggregation later. The feature warping layer 630 may also be a part of the PointNet.

For other historical 3D frame, the Arch-H may include similar components to implement similar operations as $frame_{i-k}$. After the processing of the Arch-H, warped feature maps and corresponding adaptive weights may be obtained for all historical 3D frames. The warped feature maps and corresponding adaptive weights provide operation objects of feature aggregation.

As mentioned above, the Arch-R is used to process the reference frame, $frame_i$. The Arch-R may include the feature extract sub-network 620 to produce an original feature map for $frame_i$. The original feature map for $frame_i$ provides another operation object of feature aggregation. For example, the feature extract sub-network 620 may be a part of the PointNet, which may be called "PointNetFeat".

Next, the neural network 600 may include a feature aggregation layer 640. The feature aggregation layer 640 may aggregate the warped feature map for each of $frame_{i-k}$, $frame_{i-(k-1)}$, ..., $frame_{i-1}$ along with corresponding adaptive weight to the original feature map of $frame_i$, to obtain an aggregated feature map, which accumulating rich and diverse information from the historical 3D frames. For example, the feature aggregation layer 640 may also be a part of the PointNet.

The neural network 600 may include a 3D semantic segmentation sub-network 650. The 3D semantic segmentation sub-network 650 performs 3D semantic segmentation based on the aggregated feature map from the feature aggregation layer 640, to output the outcome of 3D semantic segmentation. For example, the 3D semantic segmentation sub-network 650 may also be a part of the PointNet, which may be called "PointNetSeg".

It is to be noted that, in order to perform the feature warping, a feature map size of the 3D scene flow field for each of $frame_{i-k}$, $frame_{i-(k-1)}$, ..., $frame_{i-1}$ and the original feature map for the same frame should be aligned. Further, in order to perform the feature aggregation, a feature map size of the warped feature map for each of $frame_{i-k}$, $frame_{i-(k-1)}$, ..., $frame_{i-1}$ and the original feature map of $frame_i$ should be aligned. In an embodiment, the scene flow estimation sub-network 610 for each of $frame_{i-k}$, $frame_{i-(k-1)}$, ..., $frame_{i-1}$ may include an alignment layer (not shown) to align the feature map size of the 3D scene flow field for each of $frame_{i-k}$, $frame_{i-(k-1)}$, ..., $frame_{i-1}$ with the feature map size of the original feature map for the same frame. In another embodiment, the feature extract sub-network 620 for each of $frame_{i-k}$, $frame_{i-(k-1)}$, ..., $frame_{i-1}$ and $frame_i$ may include an alignment layer (not shown) to align the feature map size of the original feature map for each of $frame_{i-k}$, $frame_{i-(k-1)}$, ..., $frame_{i-1}$ with the feature map size of the 3D scene flow field for the same frame, and align the feature map size of the original feature map for $frame_i$ with the feature map size of the original feature map for any of $frame_{i-k}$, $frame_{i-(k-1)}$, ..., $frame_{i-1}$.

FIG. 7 shows an example workflow of the neural network 600 of FIG. 6.

Figure 8:
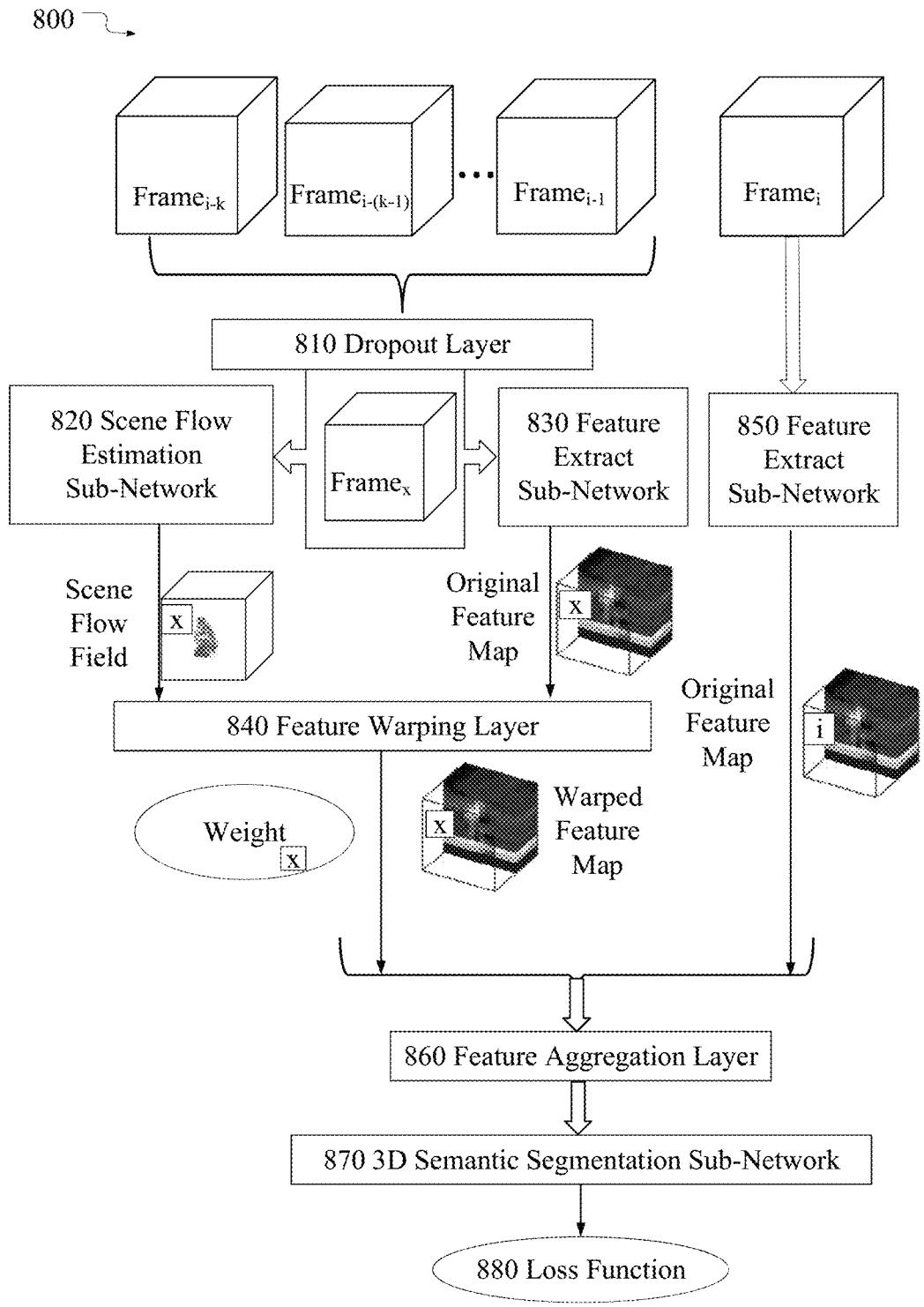
FIG. 8 shows a schematic diagram of a training neural network for point cloud based 3D semantic segmentation, according to an embodiment of the disclosure.

FIG. 8 shows a schematic diagram of a training neural network 800 for point cloud based 3D semantic segmentation, according to an embodiment of the disclosure. The training neural network 800 may be used to train trainable parameters of each layer for the neural network 600 of FIG. 6.

As illustrated, a point cloud data set for a time-ordered sequence of 3D frames is provided to the training neural network 800 as an input. The 3D frames may include a current 3D frame (indicated as $frame_i$) and one or more historical 3D frames (indicated as $frame_{i-k}$, $frame_{i-(k-1)}$, ..., $frame_{i-1}$, where i and k are positive integers and k<i) previous to the current 3D frame. The training neural network 800 uses a loss function, for example, Softmax, to evaluate the performance of the network.

Differently from the neural network 600, the training neural network 800 may include a dropout layer 810, to randomly select one from the k historical 3D frames. As shown in FIG. 8, the selected historical 3D frame is denoted as $frame_x$, where x=i−k, i−(k−1), ... i−1. The dropout layer 810 can prevent the training neural network 800 from over-fitting.

The training neural network 800 may include a scene flow estimation sub-network 820 to estimate a 3D scene flow field for $frame_x$. For example, the scene flow estimation sub-network 820 may be the FlowNet3D or any other network capable of implementing the similar operation.

The training neural network 800 may include a feature extract sub-network 830 to produce an original feature map for frame$_x$. For example, the feature extract sub-network 830 may be a part of the PointNet, which may be referred to as "PointNetFeat".

The training neural network 800 may include a feature warping layer 840 to warp the original feature map produced by the feature extract sub-network 830, based on the 3D scene flow field estimated by the scene flow estimation sub-network 820, and with reference to frame$_1$. The feature warping layer 840 may produce a warped feature map for frame$_x$ and obtain an adaptive weight accompanying the warped feature map. Both the warped feature map and the adaptive weight will participate in feature aggregation later. The feature warping layer 840 may also be a part of the PointNet.

The training neural network 800 may include a feature extract sub-network 850 to produce an original feature map for frame$_1$. For example, the feature extract sub-network 850 may be a part of the PointNet, which may be referred to as "PointNetFeat".

Next, the training neural network 800 may include a feature aggregation layer 860. The feature aggregation layer 860 may aggregate the warped feature map for frame$_x$ along with corresponding adaptive weight to the original feature map of frame$_i$, to obtain an aggregated feature map. For example, the feature aggregation layer 860 may also be a part of the PointNet.

The training neural network 800 may include a 3D semantic segmentation sub-network 870. The 3D semantic segmentation sub-network 870 performs 3D semantic segmentation based on the aggregated feature map from the feature aggregation layer 860. For example, the 3D semantic segmentation sub-network 870 may also be a part of the PointNet.

As mentioned, the performance of the training neural network 800 may be evaluated based on the loss function 880. When the result of the loss function 880 is small enough (such as, below a predefined threshold), an applicable neural network is obtained. The training neural network 800 will run repeatedly to train trainable parameters among layers of the scene flow estimation sub-network 820, the feature extract sub-network 830, the feature warping layer 840, the feature extract sub-network 850, the feature aggregation layer 860, and the 3D semantic segmentation sub-network 870, which may be collectively referred to as the PointNet. The process of training the trainable parameters among layers of the PointNet may be called "backpropagation".

During training of the neural network, the adaptive weight accompanying the warped feature map for each of the historical 3D frames may also be trained, by running the training neural network 800 repeatedly. The adaptive weights as trained will be applied along with the trained neural network, in the neural network 600 of FIG. 6.

Figure 9:
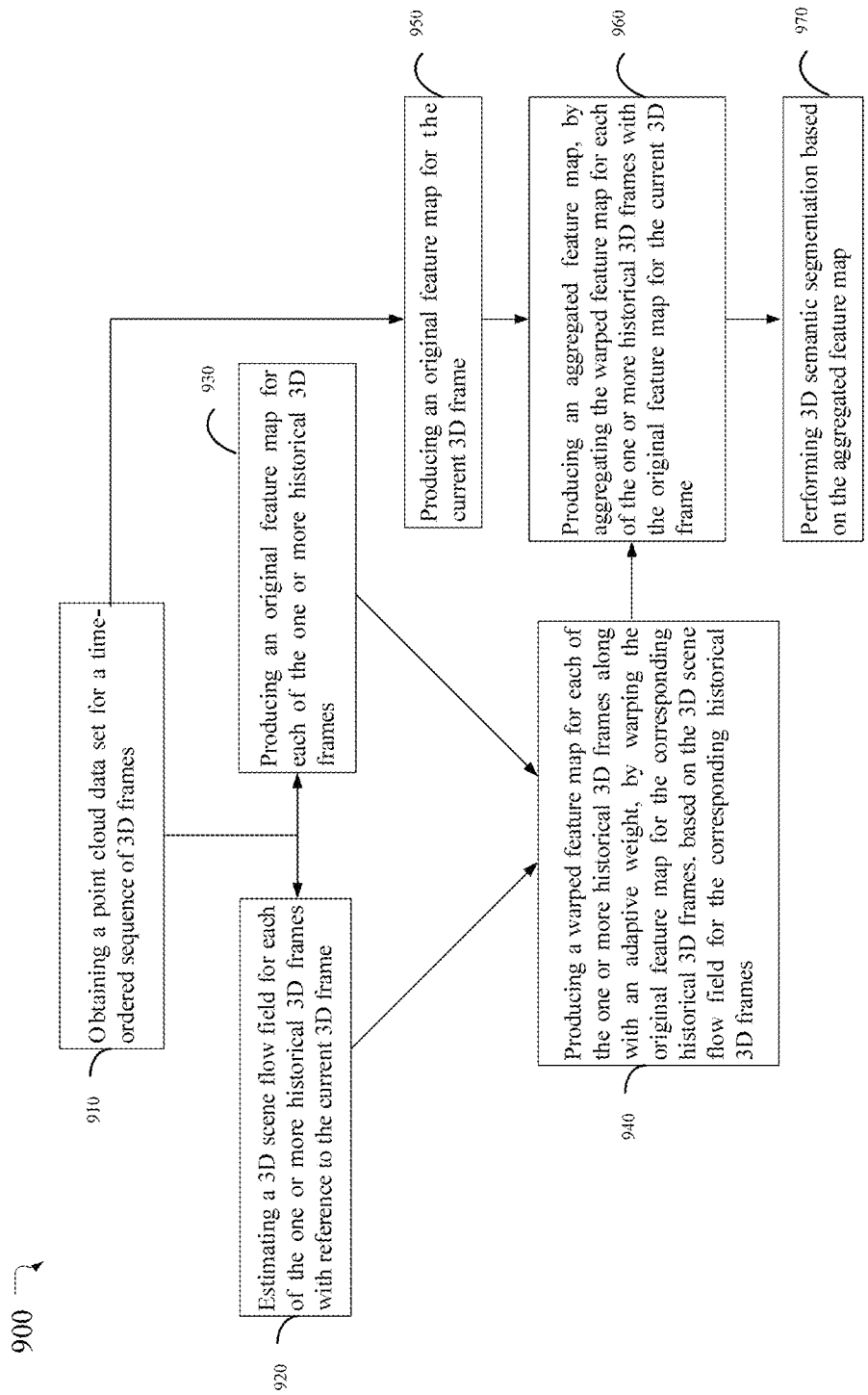
FIG. 9 is a flow diagram illustrating an example of a method for point cloud based 3D semantic segmentation, according to an embodiment of the disclosure.

FIG. 9 is a flow diagram illustrating an example of a method 900 for point cloud based 3D semantic segmentation, according to an embodiment of the disclosure. Operations of the method are performed using computational hardware, such as that described above or below (e.g., processing circuitry). In some aspects, the method 900 can be performed by the neural network 600 of FIG. 6. In other aspects, a machine-readable storage medium may store instructions associated with method 900, which when executed can cause a machine to perform the method 900.

The method 900 includes, at 910, obtaining a point cloud data set for a time-ordered sequence of 3D frames. The 3D frames including a current 3D frame and one or more historical 3D frames previous to the current 3D frame. The point cloud data set may be obtained from a vehicle-mounted LiDAR, for example. The point cloud data set may also be obtained from a local or remote database storing the point cloud data set.

At 920, a 3D scene flow field for each of the one or more historical 3D frames is estimated with reference to the current 3D frame.

At 930, an original feature map for each of the one or more historical 3D frames is produced. It is to be noted that operation 930 may happen synchronously or asynchronously with operations 920, which is not limited in the present disclosure.

At 940, a warped feature map for each of the one or more historical 3D frames is produced along with an adaptive weight, by warping the original feature map for the corresponding historical 3D frames, based on the 3D scene flow field for the corresponding historical 3D frames. The adaptive weight may be taken into consideration in the feature aggregation operation at 960 later.

At 950, an original feature map for the current 3D frames is produced. It is to be noted that operation 950 may happen concurrently with any of operations 920 to 940, which is not limited in the present disclosure.

At 960, an aggregated feature map is produced by aggregating the warped feature map for each of the one or more historical 3D frames with the original feature map for the current 3D frame.

At 970, 3D semantic segmentation is performed based on the aggregated feature map.

Though some the operations are shown in sequence, it is not meant to limit that the operations must be performed depending on the order as shown. For example, some operations may happen concurrently, or the order of some operations may be reversed.

Figure 10:
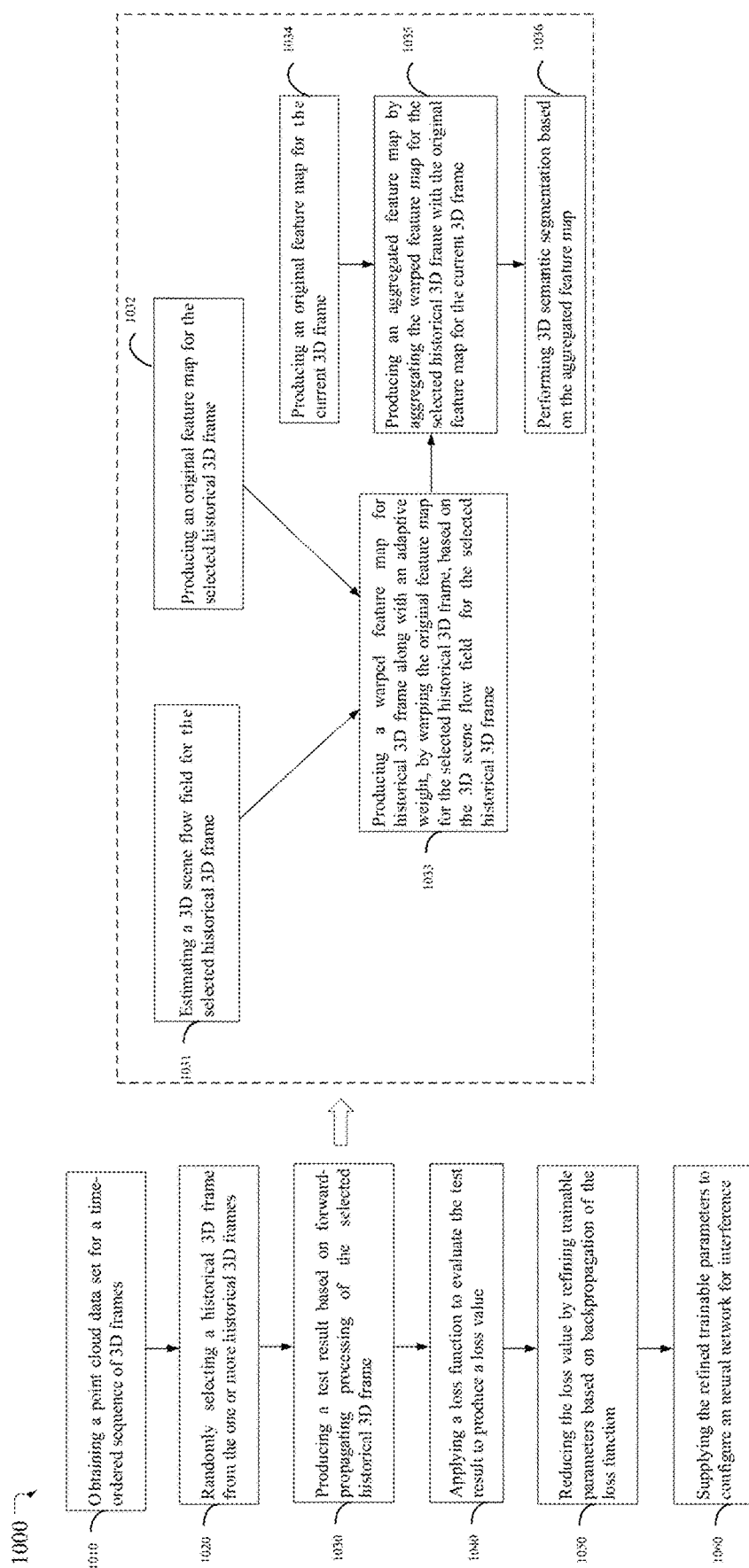
FIG. 10 is a flow diagram illustrating an example of a method for training a neural network for point cloud based 3D semantic segmentation, according to an embodiment of the disclosure.

FIG. 10 is a flow diagram illustrating an example of a method 1000 for training a neural network for point cloud based 3D semantic segmentation, according to an embodiment of the disclosure. Operations of the method are performed using computational hardware, such as that described above or below (e.g., processing circuitry). In some aspects, the method 1000 can be performed by the training neural network 800 of FIG. 8. In other aspects, a machine-readable storage medium may store instructions associated with method 1000, which when executed can cause a machine to perform the method 1000.

The method 1000 includes, at 1010, obtaining a point cloud data set for a time-ordered sequence of 3D frames. The 3D frames including a current 3D frame and one or more historical 3D frames previous to the current 3D frame. The point cloud data set may be obtained from a vehicle-mounted LiDAR, for example. The point cloud data set may also be obtained from a local or remote database storing the point cloud data set.

At 1020, a historical 3D frame is randomly selected from the one or more historical 3D frames.

At 1030, a test result is produced based on forward-propagating processing of the selected historical 3D frame through a training neural network such as, the training neural network 800 of FIG. 8.

At 1040, a loss function is applied to evaluate the test result to produce a loss value. The loss function may be Softmax, for example.

At 1050, the loss value is reduced by refining trainable parameters of the training neural network based on back-propagation of the loss function through the training neural network.

At 1060, the refined trainable parameters are supplied to configure an neural network for inference, such as the neural network 600 of FIG. 6.

The forward-propagating processing of the selected historical 3D frame at 1030, may include: estimating a 3D scene flow field for the selected historical 3D frame at 1031; and producing an original feature map for the selected historical 3D frame at 1032. It is to be noted that operation 1031 may happen synchronously or asynchronously with operations 1032, which is not limited in the present disclosure.

The forward-propagating processing of the selected historical 3D frame at 1030, may further include: at 1033, producing a warped feature map for the selected historical 3D frame along with an adaptive weight, by warping the original feature map for the selected historical 3D frame, based on the 3D scene flow field for the selected historical 3D frame.

The forward-propagating processing of the selected historical 3D frame at 1030, may further include: producing an original feature map for the current 3D frames at 1034. It is to be noted that operation 1034 may happen concurrently with any of operations 1031 to 1033, which is not limited in the present disclosure.

The forward-propagating processing of the selected historical 3D frame at 1030, may further include: at 1035, producing an aggregated feature map by aggregating the warped feature map for the selected historical 3D frame with the original feature map for the current 3D frame.

The forward-propagating processing of the selected historical 3D frame at 1030, may further include: at 1036, performing 3D semantic segmentation based on the aggregated feature map. The test result include an outcome of the 3D semantic segmentation.

Though some the operations are shown in sequence, it is not meant to limit that the operations must be performed depending on the order as shown. For example, some operations may happen concurrently, or the order of some operations may be reversed.

Figure 11:
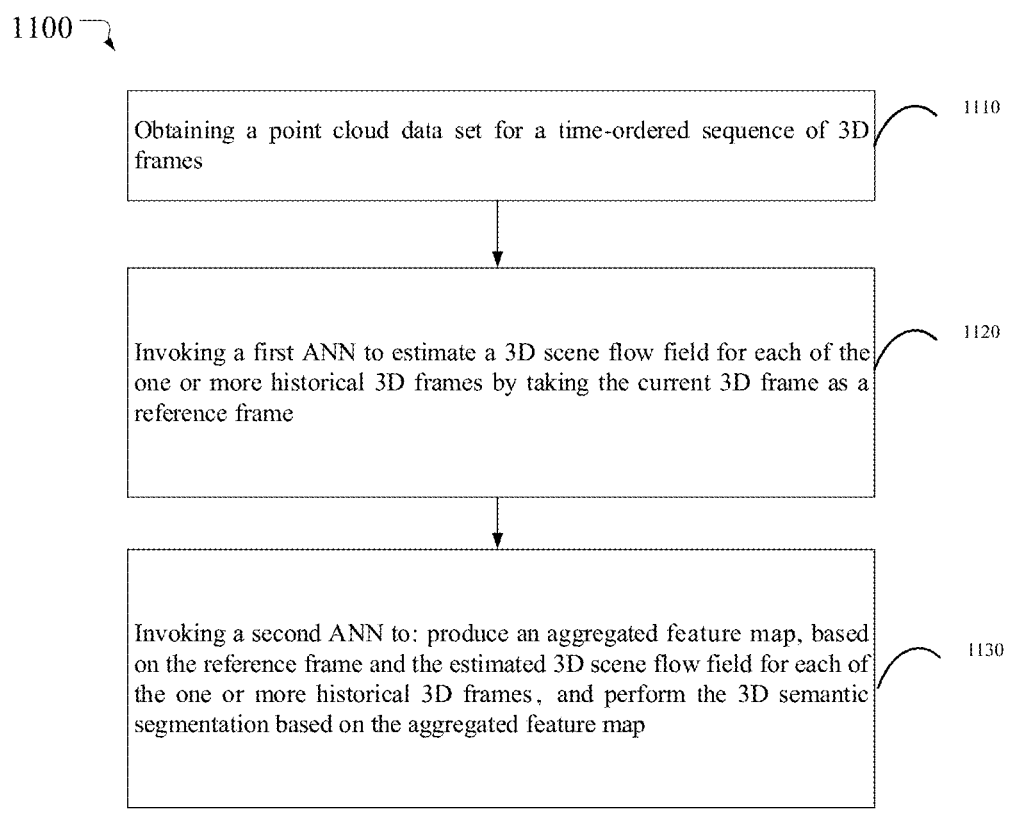
FIG. 11 is a flow diagram illustrating an example of a method for point cloud based 3D semantic segmentation, according to an embodiment of the disclosure.

FIG. 11 is a flow diagram illustrating an example of a method 1100 for point cloud based 3D semantic segmentation, according to an embodiment of the disclosure. Operations of the method are performed using computational hardware, such as that described above or below (e.g., processing circuitry). In some aspects, the method 1100 can be performed by the system 300 of FIG. 3 or a computing device in the vehicle 400 of FIG. 4. In other aspects, a machine-readable storage medium may store instructions associated with method 1100, which when executed can cause a machine to perform the method 1100.

The method 1100 includes, at 1110, obtaining a point cloud data set for a time-ordered sequence of 3D frames. The 3D frames including a current 3D frame and one or more historical 3D frames previous to the current 3D frame. The point cloud data set may be obtained from a vehicle-mounted LiDAR, for example. The point cloud data set may also be obtained from a local or remote database storing the point cloud data set.

At 1120, a first artificial neural network (ANN) is invoked to estimate a 3D scene flow field for each of the one or more historical 3D frames by taking the current 3D frame as a reference frame.

At 1130, a second ANN is invoked to produce an aggregated feature map, based on the reference frame and the estimated 3D scene flow field for each of the one or more historical 3D frames and perform the 3D semantic segmentation based on the aggregated feature map.

In some embodiments, the first ANN and the second ANN may be integrated into a single ANN, such as, the neural network 600 described in FIG. 6. The first ANN and the second ANN may be trained jointly or separately, which is not limited in the present disclosure.

Figure 12:
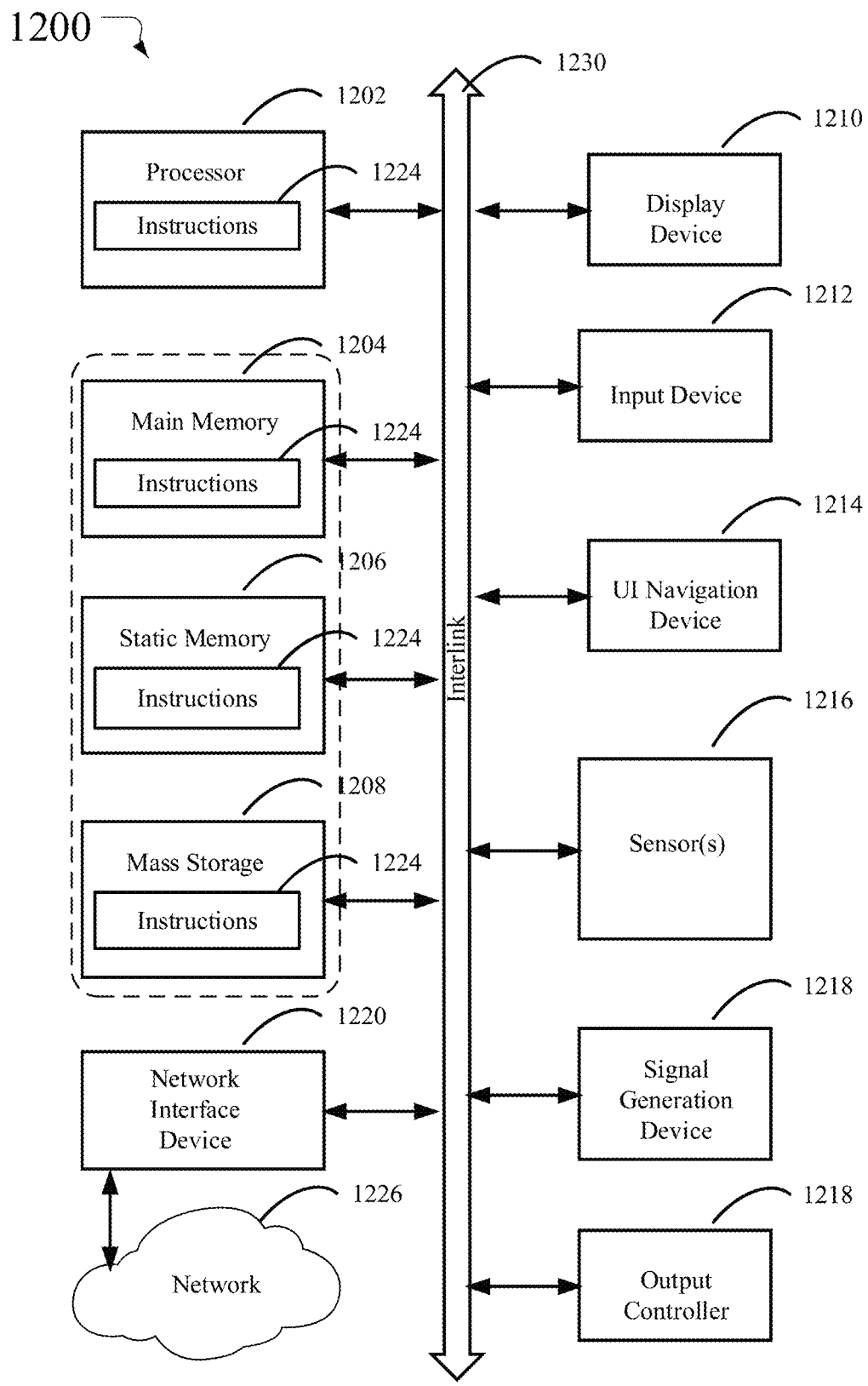
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may be performed. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In an example, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drives, tape drives, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a LiDAR, global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1222 may be representative of the instructions 1224, such as instructions 1224 themselves or a format from which the instructions 1224 may be derived. This format from which the instructions 1224 may be derived may include source code, encoded instructions (e.g., in compressed or encrypted form), packaged instructions (e.g., split into multiple packages), or the like. The information representative of the instructions 1224 in the machine readable medium 1222 may be processed by processing circuitry into the instructions to implement any of the operations discussed herein. For example, deriving the instructions 1224 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1224.

In an example, the derivation of the instructions 1224 may include assembly, compilation, or interpretation of the information (e.g., by the processing circuitry) to create the instructions 1224 from some intermediate or preprocessed format provided by the machine readable medium 1222. The information, when provided in multiple parts, may be combined, unpacked, and modified to create the instructions 1224. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Figure 13:
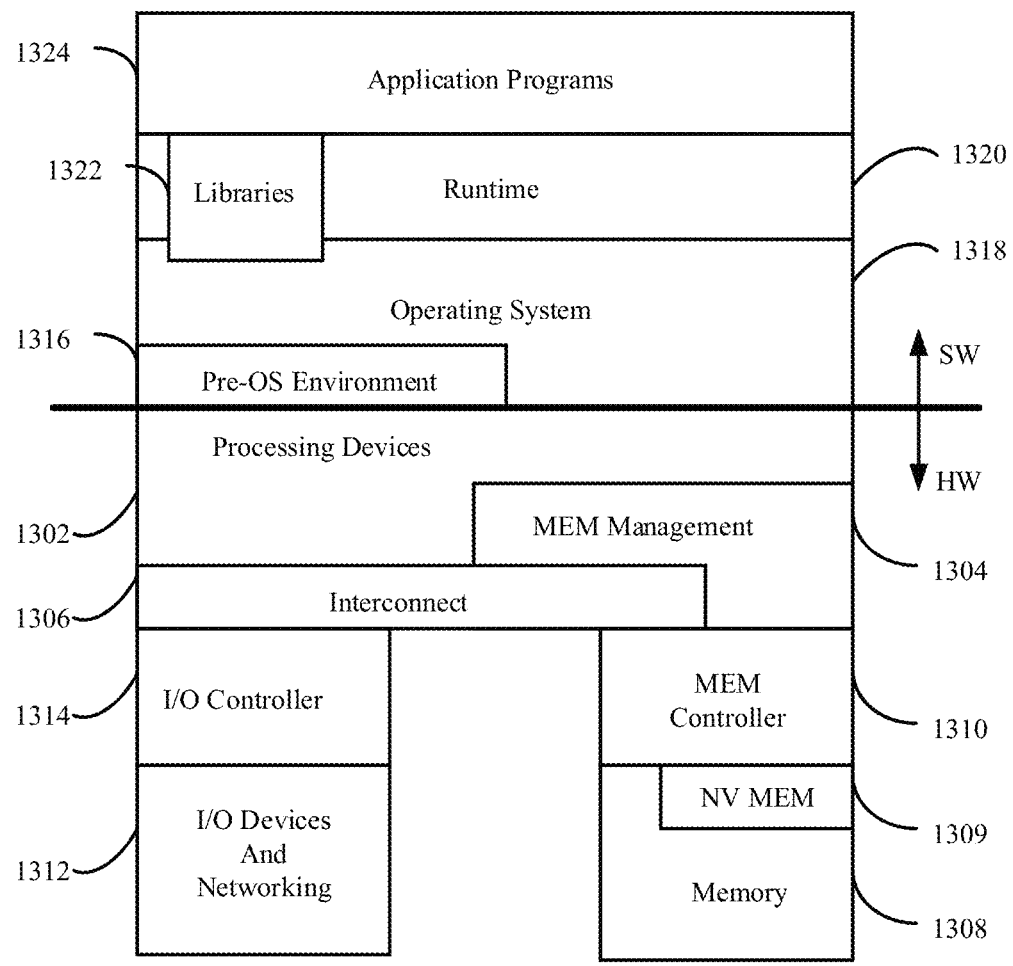
FIG. 13 is a diagram illustrating an exemplary hardware and software architecture of a computing device, according to an embodiment of the disclosure.

FIG. 13 is a diagram illustrating an exemplary hardware and software architecture of a computing device in which various interfaces between hardware components and software components are shown. As indicated by HW, hardware components are represented below the divider line, whereas software components denoted by SW reside above the divider line. On the hardware side, processing devices 1302 (which may include one or more microprocessors, digital signal processors, etc., each having one or more processor cores, are interfaced with memory management device 1304 and system interconnect 1306. Memory management device 1304 provides mappings between virtual memory used by processes being executed, and the physical memory. Memory management device 1304 may be an integral part of a central processing unit which also includes the processing devices 1302.

Interconnect 1306 includes a backplane such as memory, data, and control lines, as well as the interface with input/output devices, e.g., PCI, USB, etc. Memory 1308 (e.g., dynamic random access memory, DRAM) and non-volatile memory 1309 such as flash memory (e.g., electrically-erasable read-only memory-EEPROM, NAND Flash, NOR Flash, etc.) are interfaced with memory management device 1304 and interconnect 1306 via memory controller 1310. In an example, this architecture may support direct memory access (DMA) by peripherals. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 1312, which interface with interconnect 1306 via corresponding I/O controllers 1314.

On the software side, a pre-operating system (pre-OS) environment 1316, which is executed at initial system start-up and is responsible for initiating the boot-up of the operating system. One traditional example of pre-OS environment 1316 is a system basic input/output system (BIOS). In present-day systems, a unified extensible firmware interface (UEFI) is implemented. Pre-OS environment 1316, is responsible for initiating the launching of the operating system, but also provides an execution environment for embedded applications according to certain aspects of the invention.

Operating system (OS) 1318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 1318 provides device drivers, and a variety of common services such as those that facilitate interfacing with peripherals and networking, that provide abstraction for application programs so that the applications do not need to be responsible for handling the details of such common operations. Operating system 1318 additionally provides a graphical user interface (GUI) that facilitates interaction with the user via peripheral devices such as a monitor, keyboard, mouse, microphone, video camera, touchscreen, and the like.

Runtime system 1320 implements portions of an execution model, including such operations as putting parameters onto the stack before a function call, the behavior of disk input/output (I/O), and parallel execution-related behaviors. Runtime system 1320 may also perform support services such as type checking, debugging, or code generation and optimization.

Libraries 1322 include collections of program functions that provide further abstraction for application programs. These include shared libraries, dynamic linked libraries (DLLs), for example. Libraries 1322 may be integral to the operating system 1318, runtime system 1320, or may be added-on features, or even remotely-hosted. Libraries 1322 define an application program interface (API) through which a variety of function calls may be made by application programs 1324 to invoke the services provided by the operating system 1318. Application programs 1324 are those programs that perform useful tasks for users, beyond the tasks performed by lower-level system programs that coordinate the basis operability of the computing device itself.

Figure 14:
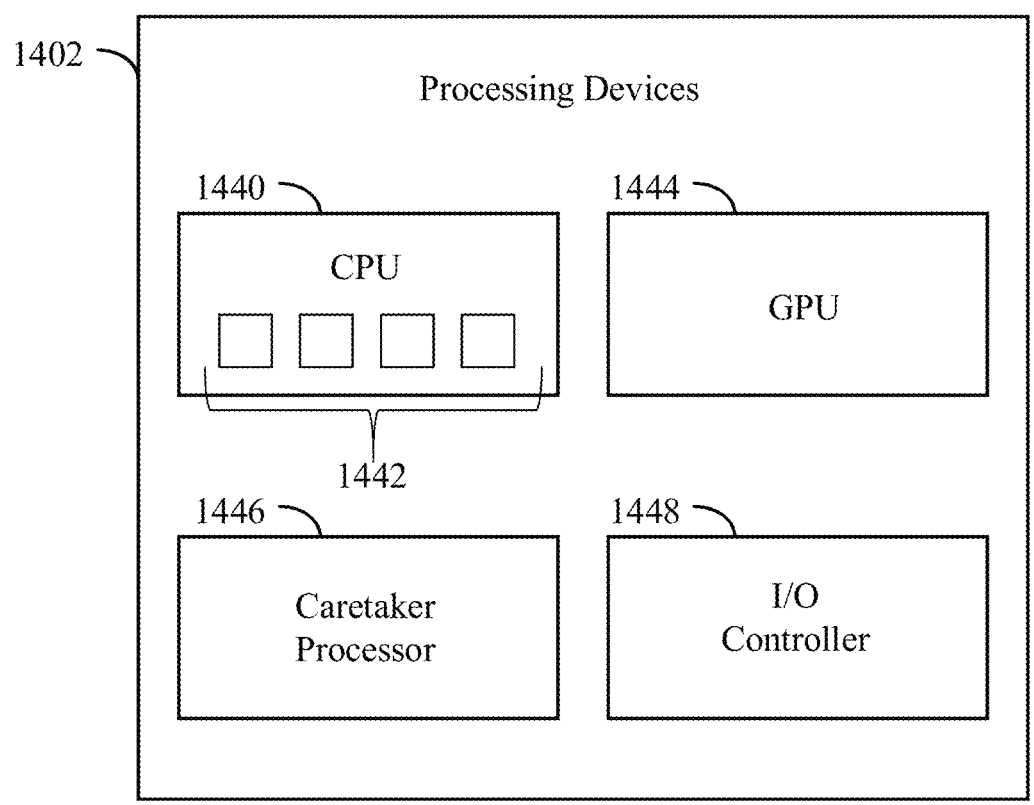
FIG. 14 is a block diagram illustrating processing devices that may be used, according to an embodiment of the disclosure.

FIG. 14 is a block diagram illustrating processing devices 1402 that may be used, according to an embodiment of the disclosure. In an example, two or more of processing devices 1402 depicted are formed on a common semiconductor substrate. CPU 1440 may contain one or more processing cores 1442, each of which has one or more arithmetic logic units (ALU), instruction fetch unit, instruction decode unit, control unit, registers, data stack pointer, program counter, and other essential components according to the particular architecture of the processor. As an illustrative example, CPU 1440 may be an x86-type of processor. Processing devices 1402 may also include a graphics processing unit (GPU) 1444. In an example, the GPU 1444 may be a specialized co-processor that offloads certain computationally-intensive operations, particularly those associated with graphics rendering, from CPU 1440. Notably, CPU 1440 and GPU 1444 generally work collaboratively, sharing access to memory resources, I/O channels, etc.

In an example, the processing devices 1402 may also include caretaker processor 1446. Caretaker processor 1446 generally does not participate in the processing work to carry out software code as CPU 1440 and GPU 1444 do. In an example, caretaker processor 1446 does not share memory space with CPU 1440 and GPU 1444, and is therefore not arranged to execute operating system or application programs. Instead, caretaker processor 1446 may execute dedicated firmware that supports the technical workings of CPU 1440, GPU 1444, and other components of the computer system. In an example, caretaker processor is implemented as a microcontroller device, which may be physically present on the same integrated circuit die as CPU 1440, or may be present on a distinct integrated circuit die. Caretaker processor 1446 may also include a dedicated set of I/O facilities to enable it to communicate with external entities. In one type of embodiment, caretaker processor 1446 is implemented using a manageability engine (ME) or platform security processor (PSP). Input/output (I/O) controller 1448 coordinates information flow between the various processing devices 1440, 1444, 1446, as well as with external circuitry, such as a system interconnect.

Figure 15:
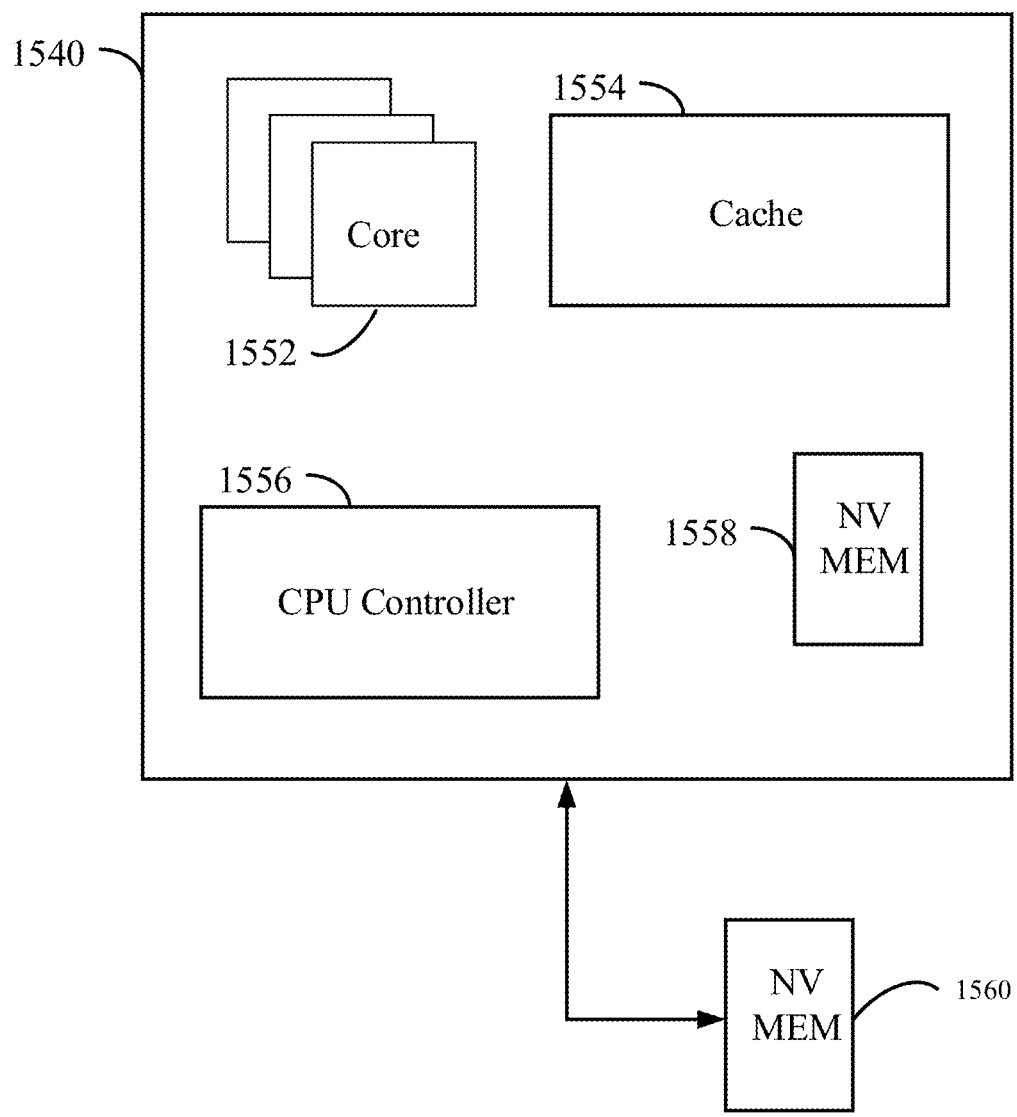
FIG. 15 is a block diagram illustrating example components of a central processing unit (CPU), according to an embodiment of the disclosure.

FIG. 15 is a block diagram illustrating example components of a CPU 1540 according to an embodiment of the disclosure. As depicted, CPU 1540 includes one or more cores 1552, cache 1554, and CPU controller 1556, which coordinates interoperation and tasking of the core(s) 1552, as well as providing an interface to facilitate data flow between the various internal components of CPU 1540, and with external components such as a memory bus or system interconnect. In one embodiment, all of the example components of CPU 1540 are formed on a common semiconductor substrate.

CPU 1540 includes non-volatile memory 1558 (e.g., flash, EEPROM, etc.) for storing certain portions of foundational code, such as an initialization engine, and microcode. Also, CPU 1540 may be interfaced with an external (e.g., formed on a separate IC) non-volatile memory device 1560 that stores foundational code that is launched by the initialization engine, such as system BIOS or UEFI code.

Some non-limiting examples are provided below. Each of the examples stands as a separate embodiment itself.

Example 1 is a device for three-dimension (3D) semantic segmentation, comprising: an interface, to obtain a point cloud data set for a time-ordered sequence of 3D frames, the 3D frames including a current 3D frame and one or more historical 3D frames previous to the current 3D frame; and processing circuitry to: invoke a first artificial neural network (ANN) to estimate a 3D scene flow field for each of the one or more historical 3D frames by taking the current 3D frame as a reference frame; and invoke a second ANN to: produce an aggregated feature map, based on the reference frame and the estimated 3D scene flow field for each of the one or more historical 3D frames; and perform the 3D semantic segmentation based on the aggregated feature map.

In Example 2, the subject matter of Example 1 includes, wherein the first ANN includes a scene flow estimation sub-network for each of the one or more historical 3D frames.

In Example 3, the subject matter of Example 2 includes, wherein the scene flow estimation sub-network includes FlowNet3D.

In Example 4, the subject matter of Examples 1-3 includes, wherein the second ANN includes PointNet.

In Example 5, the subject matter of Examples 1-4 includes, wherein the second ANN includes a feature extract sub-network for each of the one or more historical 3D frames and the current 3D frame, to generate an origin feature map for each of the one or more historical 3D frames and the current 3D frame.

In Example 6, the subject matter of Example 5 includes, wherein the second ANN includes an alignment layer for each of the one or more historical 3D frames, to align the origin feature map with the 3D scene flow field for each of the one or more historical 3D frames.

In Example 7, the subject matter of Examples 5 includes, wherein the first ANN includes an alignment layer for each of the one or more historical 3D frames, to align the 3D scene flow field with the origin feature map for each of the one or more historical 3D frames.

In Example 8, the subject matter of Examples 1-7 includes, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

In Example 9, the subject matter of Example 8 includes, wherein the second ANN includes an alignment layer for the current 3D frame, to align the origin feature map of the current 3D frame with the warped feature map for each of the one or more historical 3D frames.

In Example 10, the subject matter of Examples 8-9 includes, wherein the second ANN includes a feature aggregation layer, to aggregate the warped feature map for each of the one or more historical 3D frames with the original feature map of the current 3D frame to produce the aggregated feature map.

In Example 11, the subject matter of Examples 8-10 includes, wherein the feature warping layer is to produce an adaptive weight along with the warped feature map for each of the one or more historical 3D frames; and the feature aggregation layer is to aggregate a result of the warped feature map multiplying by the adaptive weight for each of the one or more historical 3D frames, with the original feature map of the current 3D frame to produce the aggregated feature map.

In Example 12, the subject matter of Example 11 includes, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

In Example 13, the subject matter of Examples 1-3 includes, wherein the second ANN is configured to produce the aggregated feature map by: predicting a displacement of each point in point cloud data for the one or more historical 3D frames, based on the estimated 3D scene flow field for each of the one or more historical 3D frames; obtaining a warped 3D frame for each of the one or more historical 3D frames based on the predicted displacement of each point in the point cloud data for the one or more historical 3D frames and an initial position of the point in the corresponding historical 3D frame; obtaining a warped feature map for each of the one or more historical 3D frames from the warped 3D frame for the historical 3D frame; and aggregating the warped feature map for each of the one or more historical 3D frames to an original feature map of the current 3D frame.

In Example 14, the subject matter of Examples 1-13 includes, wherein the second ANN includes a 3D semantic segmentation sub-network to perform the 3D semantic segmentation based on the aggregated feature map.

In Example 15, the subject matter of Example 14 includes, wherein wherein the 3D semantic segmentation sub-network includes PointNetSeg.

In Example 16, the subject matter of Examples 1-15 includes, wherein the first ANN and the second ANN are integrated into a single ANN.

Example 17 is a method for three-dimension (3D) semantic segmentation, comprising: obtaining a point cloud data set for a time-ordered sequence of 3D frames, the 3D frames including a current 3D frame and one or more historical 3D frames previous to the current 3D frame; invoking a first artificial neural network (ANN) to estimate a 3D scene flow field for each of the one or more historical 3D frames by taking the current 3D frame as a reference frame; and invoking a second ANN to: produce an aggregated feature map, based on the reference frame and the estimated 3D scene flow field for each of the one or more historical 3D frames; and perform the 3D semantic segmentation based on the aggregated feature map.

In Example 18, the subject matter of Example 17 includes, wherein the first ANN includes a scene flow estimation sub-network for each of the one or more historical 3D frames.

In Example 19, the subject matter of Example 18 includes, wherein the scene flow estimation sub-network includes FlowNet3D.

In Example 20, the subject matter of Examples 17-19 includes, wherein the second ANN includes PointNet.

In Example 21, the subject matter of Examples 17-20 includes, wherein the second ANN includes a feature extract sub-network for each of the one or more historical 3D frames and the current 3D frame, to generate an origin feature map for each of the one or more historical 3D frames and the current 3D frame.

In Example 22, the subject matter of Example 21 includes, wherein the second ANN includes an alignment layer for each of the one or more historical 3D frames, to align the origin feature map with the 3D scene flow field for each of the one or more historical 3D frames.

In Example 23, the subject matter of Examples 21 includes, wherein the first ANN includes an alignment layer for each of the one or more historical 3D frames, to align the 3D scene flow field with the origin feature map for each of the one or more historical 3D frames.

In Example 24, the subject matter of Examples 17-23 includes, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

In Example 25, the subject matter of Example 24 includes, wherein the second ANN includes an alignment layer for the current 3D frame, to align the origin feature map of the current 3D frame with the warped feature map for each of the one or more historical 3D frames.

In Example 26, the subject matter of Examples 24-25 includes, wherein the second ANN includes a feature aggregation layer, to aggregate the warped feature map for each of the one or more historical 3D frames with the original feature map of the current 3D frame to produce the aggregated feature map.

In Example 27, the subject matter of Examples 24-25 includes, wherein the feature warping layer is to produce an adaptive weight along with the warped feature map for each of the one or more historical 3D frames; and the feature aggregation layer is to aggregate a result of the warped feature map multiplying by the adaptive weight for each of the one or more historical 3D frames, with the original feature map of the current 3D frame to produce the aggregated feature map.

In Example 28, the subject matter of Example 27 includes, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

In Example 29, the subject matter of Examples 17-19 includes, wherein the second ANN is configured to produce the aggregated feature map by: predicting a displacement of each point in point cloud data for the one or more historical 3D frames, based on the estimated 3D scene flow field for each of the one or more historical 3D frames; obtaining a warped 3D frame for each of the one or more historical 3D frames based on the predicted displacement of each point in the point cloud data for the one or more historical 3D frames and an initial position of the point in the corresponding historical 3D frame; obtaining a warped feature map for each of the one or more historical 3D frames from the warped 3D frame for the historical 3D frame; and aggregating the warped feature map for each of the one or more historical 3D frames to an original feature map of the current 3D frame.

In Example 30, the subject matter of Examples 17-29 includes, wherein the second ANN includes a 3D semantic segmentation sub-network to perform the 3D semantic segmentation based on the aggregated feature map.

In Example 31, the subject matter of Example 30 includes, wherein wherein the 3D semantic segmentation sub-network includes PointNetSeg.

In Example 32, the subject matter of Examples 17-31 includes, wherein the first ANN and the second ANN are integrated into a single ANN Example 33 is a machine-readable storage medium having instructions stored thereon, which when executed by a processor, cause the processor to perform operations for three-dimension (3D) semantic segmentation comprising: obtaining a point cloud data set for a time-ordered sequence of 3D frames, the 3D frames including a current 3D frame and one or more historical 3D frames previous to the current 3D frame; invoking a first artificial neural network (ANN) to estimate a 3D scene flow field for each of the one or more historical 3D frames by taking the current 3D frame as a reference frame; and invoking a second ANN to: produce an aggregated feature map, based on the reference frame and the estimated 3D scene flow field for each of the one or more historical 3D frames; and perform the 3D semantic segmentation based on the aggregated feature map.

In Example 34, the subject matter of Example 33 includes, wherein the first ANN includes a scene flow estimation sub-network for each of the one or more historical 3D frames.

In Example 35, the subject matter of Example 34 includes, wherein the scene flow estimation sub-network includes FlowNet3D.

In Example 36, the subject matter of Examples 33-35 includes, wherein the second ANN includes PointNet.

In Example 37, the subject matter of Examples 33-36 includes, wherein the second ANN includes a feature extract sub-network for each of the one or more historical 3D frames and the current 3D frame, to generate an origin feature map for each of the one or more historical 3D frames and the current 3D frame.

In Example 38, the subject matter of Example 37 includes, wherein the second ANN includes an alignment layer for each of the one or more historical 3D frames, to align the origin feature map with the 3D scene flow field for each of the one or more historical 3D frames.

In Example 39, the subject matter of Examples 37 includes, wherein the first ANN includes an alignment layer for each of the one or more historical 3D frames, to align the 3D scene flow field with the origin feature map for each of the one or more historical 3D frames.

In Example 40, the subject matter of Examples 33-39 includes, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

In Example 41, the subject matter of Example 40 includes, wherein the second ANN includes an alignment layer for the current 3D frame, to align the origin feature map of the current 3D frame with the warped feature map for each of the one or more historical 3D frames.

In Example 42, the subject matter of Examples 40-41 includes, wherein the second ANN includes a feature aggregation layer, to aggregate the warped feature map for each of the one or more historical 3D frames with the original feature map of the current 3D frame to produce the aggregated feature map.

In Example 43, the subject matter of Examples 40-41 includes, wherein the feature warping layer is to produce an adaptive weight along with the warped feature map for each of the one or more historical 3D frames; and the feature aggregation layer is to aggregate a result of the warped feature map multiplying by the adaptive weight for each of the one or more historical 3D frames, with the original feature map of the current 3D frame to produce the aggregated feature map.

In Example 44, the subject matter of Example 43 includes, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

In Example 45, the subject matter of Examples 33-35 includes, wherein the second ANN is configured to produce the aggregated feature map by: predicting a displacement of each point in point cloud data for the one or more historical 3D frames, based on the estimated 3D scene flow field for each of the one or more historical 3D frames; obtaining a warped 3D frame for each of the one or more historical 3D frames based on the predicted displacement of each point in the point cloud data for the one or more historical 3D frames and an initial position of the point in the corresponding historical 3D frame; obtaining a warped feature map for each of the one or more historical 3D frames from the warped 3D frame for the historical 3D frame; and aggregating the warped feature map for each of the one or more historical 3D frames to an original feature map of the current 3D frame.

In Example 46, the subject matter of Examples 33-45 includes, wherein the second ANN includes a 3D semantic segmentation sub-network to perform the 3D semantic segmentation based on the aggregated feature map.

In Example 47, the subject matter of Example 46 includes, wherein wherein the 3D semantic segmentation sub-network includes PointNetSeg.

In Example 48, the subject matter of Examples 33-47 includes, wherein the first ANN and the second ANN are integrated into a single ANN.

Example 49 is a system, comprising the device for 3D semantic segmentation of any of examples 1-17.

Example 50 is a device for three-dimension (3D) semantic segmentation, comprising: means for obtaining a point cloud data set for a time-ordered sequence of 3D frames, the 3D frames including a current 3D frame and one or more historical 3D frames previous to the current 3D frame; means for invoking a first artificial neural network (ANN) to estimate a 3D scene flow field for each of the one or more historical 3D frames by taking the current 3D frame as a reference frame; and means for invoking a second ANN to: produce an aggregated feature map, based on the reference frame and the estimated 3D scene flow field for each of the one or more historical 3D frames, and perform the 3D semantic segmentation based on the aggregated feature map.

In Example 51, the subject matter of Example 50 includes, wherein the first ANN includes a scene flow estimation sub-network for each of the one or more historical 3D frames.

In Example 52, the subject matter of Example 51 includes, wherein the scene flow estimation sub-network includes FlowNet3D.

In Example 53, the subject matter of Examples 50-52 includes, wherein the second ANN includes PointNet.

In Example 54, the subject matter of Examples 50-53 includes, wherein the second ANN includes a feature extract sub-network for each of the one or more historical 3D frames and the current 3D frame, to generate an origin feature map for each of the one or more historical 3D frames and the current 3D frame.

In Example 55, the subject matter of Example 54 includes, wherein the second ANN includes an alignment layer for each of the one or more historical 3D frames, to align the origin feature map with the 3D scene flow field for each of the one or more historical 3D frames.

In Example 56, the subject matter of Examples 54 includes, wherein the first ANN includes an alignment layer for each of the one or more historical 3D frames, to align the 3D scene flow field with the origin feature map for each of the one or more historical 3D frames.

In Example 57, the subject matter of Examples 50-56 includes, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

In Example 58, the subject matter of Example 57 includes, wherein the second ANN includes an alignment layer for the current 3D frame, to align the origin feature map of the current 3D frame with the warped feature map for each of the one or more historical 3D frames.

In Example 59, the subject matter of Examples 57-58 includes, wherein the second ANN includes a feature aggregation layer, to aggregate the warped feature map for each of the one or more historical 3D frames with the original feature map of the current 3D frame to produce the aggregated feature map.

In Example 60, the subject matter of Examples 57-58 includes, wherein the feature warping layer is to produce an adaptive weight along with the warped feature map for each of the one or more historical 3D frames; and the feature aggregation layer is to aggregate a result of the warped feature map multiplying by the adaptive weight for each of the one or more historical 3D frames, with the original feature map of the current 3D frame to produce the aggregated feature map.

In Example 61, the subject matter of Example 60 includes, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

In Example 62, the subject matter of Examples 50-52 includes, wherein the second ANN is configured to produce the aggregated feature map by: predicting a displacement of each point in point cloud data for the one or more historical 3D frames, based on the estimated 3D scene flow field for each of the one or more historical 3D frames; obtaining a warped 3D frame for each of the one or more historical 3D frames based on the predicted displacement of each point in the point cloud data for the one or more historical 3D frames and an initial position of the point in the corresponding historical 3D frame; obtaining a warped feature map for each of the one or more historical 3D frames from the warped 3D frame for the historical 3D frame; and aggregating the warped feature map for each of the one or more historical 3D frames to an original feature map of the current 3D frame.

In Example 63, the subject matter of Examples 50-62 includes, wherein the second ANN includes a 3D semantic segmentation sub-network to perform the 3D semantic segmentation based on the aggregated feature map.

In Example 64, the subject matter of Example 63 includes, wherein wherein the 3D semantic segmentation sub-network includes PointNetSeg.

In Example 65, the subject matter of Examples 50-64 includes, wherein the first ANN and the second ANN are integrated into a single ANN.

Example 66 is an apparatus for training a neural network for three-dimension (3D) semantic segmentation, comprising: an interface, to obtain a point cloud data set for a time-ordered sequence of 3D frames, the 3D frames including a current 3D frame and one or more historical 3D frames previous to the current 3D frame; and processing circuitry to: randomly select a historical 3D frame from the one or more historical 3D frames; produce a test result based on forward-propagating processing of the selected historical 3D frame through a training neural network; apply a loss function to evaluate the test result to produce a loss value; reduce the loss value by refining trainable parameters of the training neural network, based on backpropagation of the loss function through the training neural network; and supply the refined trainable parameters to configure the neural network for 3D semantic segmentation.

In Example 67, the subject matter of Example 66 includes, wherein the test result includes an outcome of 3D semantic segmentation based on an aggregated feature map.

In Example 68, the subject matter of Examples 66-67 includes, wherein the training neural network is to include a scene flow estimation sub-network to estimate a 3D scene flow field for the selected historical 3D frame.

In Example 69, the subject matter of Example 68 includes, wherein the training neural network is to include a feature extract sub-network for the selected historical 3D frame to produce an original feature map for the selected historical 3D frame.

In Example 70, the subject matter of Example 69 includes, wherein the training neural network is to include an alignment layer positioned after the scene flow estimation sub-network to align the 3D scene flow field with the origin feature map for the selected historical 3D frame.

In Example 71, the subject matter of Examples 69-70 includes, wherein the training neural network is to include a feature warping layer to obtain a warped feature map for the selected historical 3D frame by warping the original feature map for the selected historical 3D frames based on the 3D scene flow field for the selected historical 3D frame.

In Example 72, the subject matter of Examples 68-71 includes, wherein the scene flow estimation sub-network includes FlowNet3D.

In Example 73, the subject matter of Examples 69-72 includes, wherein the feature extract sub-network includes PointNetFeat.

In Example 74, the subject matter of Examples 69-73 includes, wherein the training neural network is to include a feature extract sub-network for the current 3D frame to produce an original feature map for the current 3D frame.

In Example 75, the subject matter of Example 74 includes, wherein the training neural network is to include an alignment layer positioned after the feature extract sub-network for the selected historical 3D frame to align the origin feature map with the 3D scene flow field for the selected historical 3D frame, and an alignment layer positioned after the feature extract sub-network for the current 3D frame to align the origin feature map for the current 3D frame with the warped feature map for the selected historical 3D frame.

In Example 76, the subject matter of Examples 73-75 includes, wherein the training neural network is to include a feature aggregation layer to aggregate the warped feature map for the selected historical 3D frame with the original feature map of the current 3D frame to produce an aggregated feature map.

In Example 77, the subject matter of Example 76 includes, wherein the feature warping layer is to produce an adaptive weight along with the warped feature map for the selected historical 3D frame; and the feature aggregation layer is to aggregate a result of the warped feature map multiplying by the adaptive weight for the selected historical 3D frame, with the original feature map of the current 3D frame to produce the aggregated feature map.

In Example 78, the subject matter of Example 77 includes, wherein the adaptive weight for the warped feature map is determined by a combination of a degree of proximity of the selected historical 3D frame to the current 3D frame and a degree of occlusion of an object of interest in the selected historical 3D frame.

In Example 79, the subject matter of Example 77 includes, wherein the adaptive weight for the warped feature map is trainable.

In Example 80, the subject matter of Example 77 includes, wherein the training neural network is to include a 3D semantic segmentation sub-network to perform the 3D semantic segmentation based on the aggregated feature map and provide the test result.

In Example 81, the subject matter of Example 80 includes, wherein the trainable parameters of the training neural network are to be included in any of the feature extract sub-network and feature warping layer for the selected historical 3D frame, the feature extract sub-network for the current 3D frame, the feature aggregation layer, and the 3D semantic segmentation sub-network.

Example 82 is a method for training a neural network for three-dimension (3D) semantic segmentation, comprising: obtaining a point cloud data set for a time-ordered sequence of 3D frames, the 3D frames including a current 3D frame and one or more historical 3D frames previous to the current 3D frame; randomly selecting a historical 3D frame from the one or more historical 3D frames; producing a test result based on forward-propagating processing of the selected historical 3D frame through a training neural network; applying a loss function to evaluate the test result to produce a loss value; reducing the loss value by refining trainable parameters of the training neural network, based on backpropagation of the loss function through the training neural network; and supplying the refined trainable parameters to configure the neural network for 3D semantic segmentation.

In Example 83, the subject matter of Example 82 includes, wherein the test result includes an outcome of 3D semantic segmentation based on an aggregated feature map.

In Example 84, the subject matter of Examples 81-82 includes, wherein the training neural network is to include a scene flow estimation sub-network to estimate a 3D scene flow field for the selected historical 3D frame.

In Example 85, the subject matter of Example 84 includes, wherein the training neural network is to include a feature extract sub-network for the selected historical 3D frame to produce an original feature map for the selected historical 3D frame.

In Example 86, the subject matter of Example 84 includes, wherein the training neural network is to include an alignment layer positioned after the scene flow estimation sub-network to align the 3D scene flow field with the origin feature map for the selected historical 3D frame.

In Example 87, the subject matter of Examples 84-86 includes, wherein the training neural network is to include a feature warping layer to obtain a warped feature map for the selected historical 3D frame by warping the original feature map for the selected historical 3D frames based on the 3D scene flow field for the selected historical 3D frame.

In Example 88, the subject matter of Examples 84-87 includes, wherein the scene flow estimation sub-network includes FlowNet3D.

In Example 89, the subject matter of Examples 84-88 includes, wherein the feature extract sub-network includes PointNetFeat.

In Example 90, the subject matter of Examples 85-89 includes, wherein the training neural network is to include a feature extract sub-network for the current 3D frame to produce an original feature map for the current 3D frame.

In Example 91, the subject matter of Example 90 includes, wherein the training neural network is to include an alignment layer positioned after the feature extract sub-network for the selected historical 3D frame to align the origin feature map with the 3D scene flow field for the selected historical 3D frame, and an alignment layer positioned after the feature extract sub-network for the current 3D frame to align the origin feature map for the current 3D frame with the warped feature map for the selected historical 3D frame.

In Example 92, the subject matter of Examples 89-91 includes, wherein the training neural network is to include a feature aggregation layer to aggregate the warped feature map for the selected historical 3D frame with the original feature map of the current 3D frame to produce an aggregated feature map.

In Example 93, the subject matter of Example 92 includes, wherein the feature warping layer is to produce an adaptive weight along with the warped feature map for the selected historical 3D frame; and the feature aggregation layer is to aggregate a result of the warped feature map multiplying by the adaptive weight for the selected historical 3D frame, with the original feature map of the current 3D frame to produce the aggregated feature map.

In Example 94, the subject matter of Example 93 includes, wherein the adaptive weight for the warped feature map is determined by a combination of a degree of proximity of the selected historical 3D frame to the current 3D frame and a degree of occlusion of an object of interest in the selected historical 3D frame.

In Example 95, the subject matter of Example 93 includes, wherein the adaptive weight for the warped feature map is trainable.

In Example 96, the subject matter of Example 93 includes, wherein the training neural network is to include a 3D semantic segmentation sub-network to perform the 3D semantic segmentation based on the aggregated feature map and provide the test result.

In Example 97, the subject matter of Example 96 includes, wherein the trainable parameters of the training neural network are to be included in any of the feature extract sub-network and feature warping layer for the selected historical 3D frame, the feature extract sub-network for the current 3D frame, the feature aggregation layer, and the 3D semantic segmentation sub-network.

Example 98 is a machine-readable storage medium having instructions stored thereon, which when executed by a processor, cause the processor to perform operations for training a neural network for three-dimension (3D) semantic segmentation, the operations comprises: obtaining a point cloud data set for a time-ordered sequence of 3D frames, the 3D frames including a current 3D frame and one or more historical 3D frames previous to the current 3D frame; randomly selecting a historical 3D frame from the one or more historical 3D frames; producing a test result based on forward-propagating processing of the selected historical 3D frame through a training neural network; applying a loss function to evaluate the test result to produce a loss value; reducing the loss value by refining trainable parameters of the training neural network, based on backpropagation of the loss function through the training neural network; and supplying the refined trainable parameters to configure the neural network for 3D semantic segmentation.

In Example 99, the subject matter of Example 98 includes, wherein the test result includes an outcome of 3D semantic segmentation based on an aggregated feature map.

In Example 100, the subject matter of Examples 98-99 includes, wherein the training neural network is to include a scene flow estimation sub-network to estimate a 3D scene flow field for the selected historical 3D frame.

In Example 101, the subject matter of Example 100 includes, wherein the training neural network is to include a feature extract sub-network for the selected historical 3D frame to produce an original feature map for the selected historical 3D frame.

In Example 102, the subject matter of Example 100 includes, wherein the training neural network is to include an alignment layer positioned after the scene flow estimation sub-network to align the 3D scene flow field with the origin feature map for the selected historical 3D frame.

In Example 103, the subject matter of Examples 100-102 includes, wherein the training neural network is to include a feature warping layer to obtain a warped feature map for the selected historical 3D frame by warping the original feature map for the selected historical 3D frames based on the 3D scene flow field for the selected historical 3D frame.

In Example 104, the subject matter of Examples 100-103 includes, wherein the scene flow estimation sub-network includes FlowNet3D.

In Example 105, the subject matter of Examples 100-104 includes, wherein the feature extract sub-network includes PointNetFeat.

In Example 106, the subject matter of Examples 100-105 includes, wherein the training neural network is to include a feature extract sub-network for the current 3D frame to produce an original feature map for the current 3D frame.

In Example 107, the subject matter of Example 106 includes, wherein the training neural network is to include an alignment layer positioned after the feature extract sub-network for the selected historical 3D frame to align the origin feature map with the 3D scene flow field for the selected historical 3D frame, and an alignment layer positioned after the feature extract sub-network for the current 3D frame to align the origin feature map for the current 3D frame with the warped feature map for the selected historical 3D frame.

In Example 108, the subject matter of Examples 105-107 includes, wherein the training neural network is to include a feature aggregation layer to aggregate the warped feature map for the selected historical 3D frame with the original feature map of the current 3D frame to produce an aggregated feature map.

In Example 109, the subject matter of Example 108 includes, wherein the feature warping layer is to produce an adaptive weight along with the warped feature map for the selected historical 3D frame; and the feature aggregation layer is to aggregate a result of the warped feature map multiplying by the adaptive weight for the selected historical 3D frame, with the original feature map of the current 3D frame to produce the aggregated feature map.

In Example 110, the subject matter of Example 109 includes, wherein the adaptive weight for the warped feature map is determined by a combination of a degree of proximity of the selected historical 3D frame to the current 3D frame and a degree of occlusion of an object of interest in the selected historical 3D frame.

In Example 111, the subject matter of Example 109 includes, wherein the adaptive weight for the warped feature map is trainable.

In Example 112, the subject matter of Example 109 includes, wherein the training neural network is to include a 3D semantic segmentation sub-network to perform the 3D semantic segmentation based on the aggregated feature map and provide the test result.

In Example 113, the subject matter of Example 112 includes, wherein the trainable parameters of the training neural network are to be included in any of the feature extract sub-network and feature warping layer for the selected historical 3D frame, the feature extract sub-network for the current 3D frame, the feature aggregation layer, and the 3D semantic segmentation sub-network.

Example 114 is a device for training a neural network for three-dimension (3D) semantic segmentation, comprising: means for obtaining a point cloud data set for a time-ordered sequence of 3D frames, the 3D frames including a current 3D frame and one or more historical 3D frames previous to the current 3D frame; means for randomly selecting a historical 3D frame from the one or more historical 3D frames; means for producing a test result based on forward-propagating processing of the selected historical 3D frame through a training neural network; means for applying a loss function to evaluate the test result to produce a loss value; reducing the loss value by refining trainable parameters of the training neural network, based on backpropagation of the loss function through the training neural network; and means for supplying the refined trainable parameters to configure the neural network for 3D semantic segmentation.

In Example 115, the subject matter of Example 114 includes, wherein the test result includes an outcome of 3D semantic segmentation based on an aggregated feature map.

In Example 116, the subject matter of Examples 114-115 includes, wherein the training neural network is to include a scene flow estimation sub-network to estimate a 3D scene flow field for the selected historical 3D frame.

In Example 117, the subject matter of Example 116 includes, wherein the training neural network is to include a feature extract sub-network for the selected historical 3D frame to produce an original feature map for the selected historical 3D frame.

In Example 118, the subject matter of Example 116 includes, wherein the training neural network is to include an alignment layer positioned after the scene flow estimation sub-network to align the 3D scene flow field with the origin feature map for the selected historical 3D frame.

In Example 119, the subject matter of Examples 116-118 includes, wherein the training neural network is to include a feature warping layer to obtain a warped feature map for the selected historical 3D frame by warping the original feature map for the selected historical 3D frames based on the 3D scene flow field for the selected historical 3D frame.

In Example 120, the subject matter of Examples 116-119 includes, wherein the scene flow estimation sub-network includes FlowNet3D.

In Example 121, the subject matter of Examples 116-120 includes, wherein the feature extract sub-network includes PointNetFeat.

In Example 122, the subject matter of Examples 117-121 includes, wherein the training neural network is to include a feature extract sub-network for the current 3D frame to produce an original feature map for the current 3D frame.

In Example 123, the subject matter of Example 122 includes, wherein the training neural network is to include an alignment layer positioned after the feature extract sub-network for the selected historical 3D frame to align the origin feature map with the 3D scene flow field for the selected historical 3D frame, and an alignment layer positioned after the feature extract sub-network for the current 3D frame to align the origin feature map for the current 3D frame with the warped feature map for the selected historical 3D frame.

In Example 124, the subject matter of Examples 121-123 includes, wherein the training neural network is to include a feature aggregation layer to aggregate the warped feature map for the selected historical 3D frame with the original feature map of the current 3D frame to produce an aggregated feature map.

In Example 125, the subject matter of Example 124 includes, wherein the feature warping layer is to produce an adaptive weight along with the warped feature map for the selected historical 3D frame; and the feature aggregation layer is to aggregate a result of the warped feature map multiplying by the adaptive weight for the selected historical 3D frame, with the original feature map of the current 3D frame to produce the aggregated feature map.

In Example 126, the subject matter of Example 125 includes, wherein the adaptive weight for the warped feature map is determined by a combination of a degree of proximity of the selected historical 3D frame to the current 3D frame and a degree of occlusion of an object of interest in the selected historical 3D frame.

In Example 127, the subject matter of Example 125 includes, wherein the adaptive weight for the warped feature map is trainable.

In Example 128, the subject matter of Example 125 includes, wherein the training neural network is to include a 3D semantic segmentation sub-network to perform the 3D semantic segmentation based on the aggregated feature map and provide the test result.

In Example 129, the subject matter of Example 128 includes, wherein the trainable parameters of the training neural network are to be included in any of the feature extract sub-network and feature warping layer for the selected historical 3D frame, the feature extract sub-network for the current 3D frame, the feature aggregation layer, and the 3D semantic segmentation sub-network.

Example 130 is a vehicle, comprising: a sensor, to capture point cloud data for surroundings of the vehicle; and the device for three-dimension (3D) semantic segmentation of any of Examples 1-16.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for three-dimension (3D) semantic segmentation, comprising:
an interface, to obtain a point cloud data set for a time-ordered sequence of 3D frames, the 3D frames including a current 3D frame and one or more historical 3D frames previous to the current 3D frame; and
processing circuitry, to:
invoke a first artificial neural network (ANN) to estimate a 3D scene flow field for each of the one or more historical 3D frames by taking the current 3D frame as a reference frame; and
invoke a second ANN to:
produce an aggregated feature map, based on the reference frame and the estimated 3D scene flow field for each of the one or more historical 3D frames; and
perform the 3D semantic segmentation based on the aggregated feature map,
wherein the second ANN includes a feature extract sub-network for each of the one or more historical 3D frames and the current 3D frame, to generate an origin feature map for each of the one or more historical 3D frames and the current 3D frame.

2. The device of claim 1, wherein the first ANN includes a scene flow estimation sub-network for each of the one or more historical 3D frames.

3. The device of claim 1, wherein the second ANN includes an alignment layer for each of the one or more historical 3D frames, to align the origin feature map with the 3D scene flow field for each of the one or more historical 3D frames.

4. The device of claim 1, wherein the first ANN includes an alignment layer for each of the one or more historical 3D frames, to align the 3D scene flow field with the origin feature map for each of the one or more historical 3D frames.

5. The device of claim 1, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

6. The device of claim 5, wherein the second ANN includes an alignment layer for the current 3D frame, to align the origin feature map of the current 3D frame with the warped feature map for each of the one or more historical 3D frames.

7. The device of claim 5, wherein the second ANN includes a feature aggregation layer, to aggregate the warped feature map for each of the one or more historical 3D frames with the original feature map of the current 3D frame to produce the aggregated feature map.

8. The device of claim 7, wherein the feature warping layer is to produce an adaptive weight along with the warped feature map for each of the one or more historical 3D frames; and
the feature aggregation layer is to aggregate a result of the warped feature map multiplying by the adaptive weight for each of the one or more historical 3D frames, with the original feature map of the current 3D frame to produce the aggregated feature map.

9. The device of claim 8, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

10. The device of claim 1, wherein the second ANN includes a 3D semantic segmentation sub-network to perform the 3D semantic segmentation based on the aggregated feature map.

11. The device of claim 1, wherein the first ANN and the second ANN are integrated into a single ANN.

12. A device for three-dimension (3D) semantic segmentation, comprising:
an interface, to obtain a point cloud data set for a time-ordered sequence of 3D frames, the 3D frames including a current 3D frame and one or more historical 3D frames previous to the current 3D frame; and
processing circuitry, to:
invoke a first artificial neural network (ANN) to estimate a 3D scene flow field for each of the one or more historical 3D frames by taking the current 3D frame as a reference frame; and invoke a second ANN to:
produce an aggregated feature map, based on the reference frame and the estimated 3D scene flow field for each of the one or more historical 3D frames; and
perform the 3D semantic segmentation based on the aggregated feature map,
wherein the second ANN is configured to produce the aggregated feature map by:
predicting a displacement of each point in point cloud data for the one or more historical 3D frames, based on the estimated 3D scene flow field for each of the one or more historical 3D frames;
obtaining a warped 3D frame for each of the one or more historical 3D frames based on the predicted displacement of each point in the point cloud data for the one or more historical 3D frames and an initial position of the point in the corresponding historical 3D frame;
obtaining a warped feature map for each of the one or more historical 3D frames from the warped 3D frame for the historical 3D frame; and
aggregating the warped feature map for each of the one or more historical 3D frames to an original feature map of the current 3D frame.

13. An apparatus for three-dimension (3D) semantic segmentation, comprising:
means for obtaining a point cloud data set for a time-ordered sequence of 3D frames, the 3D frames including a current 3D frame and one or more historical 3D frames previous to the current 3D frame; and
means for invoking a first artificial neural network (ANN) to estimate a 3D scene flow field for each of the one or more historical 3D frames by taking the current 3D frame as a reference frame; and
means for invoking a second ANN to: produce an aggregated feature map, based on the reference frame and the estimated 3D scene flow field for each of the one or more historical 3D frames, and perform the 3D semantic segmentation based on the aggregated feature map,
wherein the second ANN includes a feature extract sub-network for each of the one or more historical 3D frames and the current 3D frame, to generate an origin feature map for each of the one or more historical 3D frames and the current 3D frame.

14. The apparatus of claim 13, wherein the first ANN includes a scene flow estimation sub-network for each of the one or more historical 3D frames.

15. The apparatus of claim 13, wherein the second ANN includes an alignment layer for each of the one or more historical 3D frames, to align the origin feature map with the 3D scene flow field for each of the one or more historical 3D frames.

16. The apparatus of claim 13, wherein the first ANN includes an alignment layer for each of the one or more historical 3D frames, to align the 3D scene flow field with the origin feature map for each of the one or more historical 3D frames.

17. The apparatus of claim 13, wherein the second ANN includes a feature warping layer for each of the one or more historical 3D frames, to obtain a warped feature map for each of the one or more historical 3D frames, by warping the original feature map for each of the one or more historical 3D frames based on the 3D scene flow field for each of the one or more historical 3D frames.

18. The apparatus of claim 17, wherein the second ANN includes an alignment layer for the current 3D frame, to align the origin feature map of the current 3D frame with the warped feature map for each of the one or more historical 3D frames.

19. The apparatus of claim 17, wherein the second ANN includes a feature aggregation layer, to aggregate the warped feature map for each of the one or more historical 3D frames with the original feature map of the current 3D frame to produce the aggregated feature map.

20. The apparatus of claim 19, wherein the feature warping layer is to produce an adaptive weight along with the warped feature map for each of the one or more historical 3D frames; and
the feature aggregation layer is to aggregate a result of the warped feature map multiplying by the adaptive weight for each of the one or more historical 3D frames, with the original feature map of the current 3D frame to produce the aggregated feature map.

21. The apparatus of claim 19, wherein the adaptive weight for the warped feature map for each of the one or more historical 3D frames is determined by a combination of a degree of proximity of the corresponding historical 3D frame to the reference frame and a degree of occlusion of an object of interest in the corresponding historical 3D frame.

22. A non-transitory machine-readable storage medium having instructions stored thereon, which when executed by a processor, cause the processor to perform operations for three-dimension (3D) semantic segmentation, the operations comprises:
obtaining a point cloud data set for a time-ordered sequence of 3D frames, the 3D frames including a current 3D frame and one or more historical 3D frames previous to the current 3D frame; and
invoking a first artificial neural network (ANN) to estimate a 3D scene flow field for each of the one or more historical 3D frames by taking the current 3D frame as a reference frame; and
invoking a second ANN to: produce an aggregated feature map, based on the reference frame and the estimated 3D scene flow field for each of the one or more historical 3D frames, and perform the 3D semantic segmentation based on the aggregated feature map,
wherein the second ANN includes a feature extract sub-network for each of the one or more historical 3D frames and the current 3D frame, to generate an origin feature map for each of the one or more historical 3D frames and the current 3D frame.

23. A non-transitory machine-readable storage medium having instructions stored thereon, which when executed by a processor, cause the processor to perform operations for training a neural network for three-dimension (3D) semantic segmentation, the operations comprises:
obtaining a point cloud data set for a time-ordered sequence of 3D frames, the 3D frames including a current 3D frame and one or more historical 3D frames previous to the current 3D frame;
randomly selecting a historical 3D frame from the one or more historical 3D frames;
producing a test result based on forward-propagating processing of the selected historical 3D frame through a training neural network;
applying a loss function to evaluate the test result to produce a loss value;

reducing the loss value by refining trainable parameters of the training neural network, based on backpropagation of the loss function through the training neural network; and supplying the refined trainable parameters to configure the neural network for 3D semantic segmentation.

24. The non-transitory machine-readable storage medium of claim 23, wherein the test result includes an outcome of 3D semantic segmentation based on an aggregated feature map.

* * * * *